US011208060B2

(12) United States Patent
Deschênes

(10) Patent No.: US 11,208,060 B2
(45) Date of Patent: Dec. 28, 2021

(54) CONFIGURABLE MANAGEMENT SYSTEM FOR A VEHICLE AND METHOD OF USE

(71) Applicant: LES SYSTÈMES CYBERKAR, Terrebonne (CA)

(72) Inventor: Eric Deschênes, Terrebonne (CA)

(73) Assignee: LES SYSTÈMES CYBERKAR, Terrebonne (CA)

(*) Notice: Subject to any disclaimer, the term of this patent is extended or adjusted under 35 U.S.C. 154(b) by 0 days.

(21) Appl. No.: 16/632,335

(22) PCT Filed: Jul. 5, 2018

(86) PCT No.: PCT/CA2018/050820
§ 371 (c)(1),
(2) Date: Jan. 17, 2020

(87) PCT Pub. No.: WO2019/014754
PCT Pub. Date: Jan. 24, 2019

(65) Prior Publication Data
US 2020/0180524 A1    Jun. 11, 2020

Related U.S. Application Data

(60) Provisional application No. 62/535,086, filed on Jul. 20, 2017.

(51) Int. Cl.
*H04L 29/08* (2006.01)
*B60R 16/023* (2006.01)
(Continued)

(52) U.S. Cl.
CPC .......... *B60R 16/023* (2013.01); *G05B 19/042* (2013.01); *H04L 41/0806* (2013.01);
(Continued)

(58) Field of Classification Search
CPC ................ B60R 16/023; G05B 19/042; G05B 2219/2637; H04L 41/0806; H04L 67/12; H04L 12/40; G06F 3/167
See application file for complete search history.

(56) References Cited

U.S. PATENT DOCUMENTS 6,728,603 B2    4/2004  Pruzan et al.
7,356,832 B1 *  4/2008  Eibach ................... B60R 25/00
                                                      701/31.4
(Continued)

FOREIGN PATENT DOCUMENTS

CN    106564441    4/2017
JP    2006256457   9/2006

OTHER PUBLICATIONS

English Translation—Machine Generated of CN10656441A, "Vehicle Wireless Intelligence Control System", published an Apr. 19, 2017.
(Continued)

*Primary Examiner* — Kim T Nguyen
(74) *Attorney, Agent, or Firm* — Bereskin & Parr LLP/S.E.N.C.R.L., s.r.l.

(57) ABSTRACT

A configurable management system for a vehicle includes a receiving unit adapted to receive a message associated with a vehicle resource from a communication network of the vehicle. A control unit is adapted to determine a vehicle resource associated with the received message. An integration unit includes an external network connected to the control unit and the integration unit further includes at least one node, wherein the at least one node is configured to send an external message on the external network to the control unit. The control unit converts the external message to a suitable message that is sent to the vehicule resource.

13 Claims, 20 Drawing Sheets

(51) Int. Cl.
　　　*G05B 19/042*　　　(2006.01)
　　　*H04L 12/24*　　　(2006.01)
　　　*G06F 3/16*　　　(2006.01)

(52) U.S. Cl.
　　　CPC ...... *H04L 67/12* (2013.01); *G05B 2219/2637* (2013.01); *G06F 3/167* (2013.01)

(56) References Cited

U.S. PATENT DOCUMENTS

| | | |
|---|---|---|
| 9,390,625 B2 | 7/2016 | Green et al. |
| 9,596,225 B2 * | 3/2017 | Kim ........................ H04B 3/56 |
| 2013/0204466 A1 | 8/2013 | Ricci |
| 2013/0204484 A1 | 8/2013 | Ricci |
| 2013/0293712 A1 | 11/2013 | Turner et al. |
| 2017/0043731 A1 | 2/2017 | Kim et al. |
| 2019/0146484 A1 * | 5/2019 | Lin ........................ H04W 12/06 701/2 |

OTHER PUBLICATIONS

English Translation—Machine Generated of JP2006256457A, "On-Vehicle Data Management Device, and Vehicular Information Supplying System", published on Sep. 28, 2006.

* cited by examiner

| Outputs | Example of Functions | Message to activate output(s) | Message to confirm state of output(s) |
|---|---|---|---|
| Output 1 | Activate sirens | Message 10 | Message 11 |
| Output 2 | Activate beacons | Message 20 | Message 21 |
| Output 3 | Supply power to element X | Message 30 | Message 31 |
| Etc. | Etc. | Etc. | Etc. |

CONFIGURABLE MANAGEMENT SYSTEM FOR A VEHICLE AND METHOD OF USE

CROSS-REFERENCE TO RELATED APPLICATIONS

The present application is a 35 USC 371 national stage entry of PCT/CA2018/050820 filed on Jul. 5, 2018 and which claims priority to U.S. application No. 62/535,086 filed on Jul. 20, 2017. These documents are hereby incorporated herein by reference in their entirety.

FIELD OF THE DISCLOSURE

The present subject matter relates generally to emergency vehicles integration of all added equipment and controls permitting the user to operate the system and particularly to integrate vehicle sensors information, emergency equipment control, computer applications control, network communication and lighting equipment integration into 2 separate controllers named low level control unit (LLCU) and application level control unit (ALCU).

BACKGROUND OF THE DISCLOSURE

U.S. Pat. No. 9,197,906 describes an aircraft cabin management system including a) a communication interface system; b) a seat interface system; c) at least one Cabin Distribution Unit (CDU); and, d) a communication network. The communication interface system includes an integrated Cabin Server Unit (CSU) providing the combined functionality of aircraft communications, networking, and computational resources; and, an Information Maintenance Portal (IMP) providing maintenance access for the users of the aircraft cabin management system and the users of avionics equipment. The seat interface system includes a number of Modular Seat Interface Units (MSIUs), each MSIU providing device input/output connections for a defined portion of the interior of the aircraft cabin. The communication network operatively interconnects the communication interface system; the seat interface system; and the at least one CDU, as well as other equipment installed in the aircraft. The aircraft cabin management system provides an integrated communications and service backbone.

US2003052801 (A1) describes an ASCII gateway to in-vehicle system provides bi-directional translation between multiplexed motor vehicle networks and industrial control and monitoring devices. Integrated hardware and software components provide data communications between motor vehicle electronic control module networks and RS-232 serial ASCII-text capable device, for industrial control and/or industrial automation application in manufacturing or assembly operations. Communications networks (CAN, SAE or ISO protocols) implemented inside motor vehicles pass data between electronic control modules that control operation of important vehicle components like engine, transmission and brake systems, have their messages converted to RS-232 serial ASCII-text; and from RS-232 serial ASCII-text converted to motor vehicle communications network by the system. Messages to monitor and/or control vehicle networks are generated by a serial ASCII-test capable device. Multiple vehicle protocols are supported by the system. The system translates between RS-232 serial ASCII-text message generated or received by a device and the vehicle network.

US2016261561 (A1) describes a one-way gateway and a vehicle network system and method for protecting networks within a vehicle using the one-way gateway. The one-way gateway includes a communication control unit, a physical one-way communication unit, and a data transmission/reception unit. The communication control unit takes charge of communication with a device of the internal network or infotainment network of a vehicle. The physical one-way communication unit configures a communication section between the internal network and the infotainment network in a physically one-way form. The data transmission/reception unit transfers data, transmitted by the device of the internal network or infotainment network, to the physical one-way communication unit via the communication control unit, and transfers data, received via the physical one-way communication unit, to the device of the internal network or infotainment network.

CN205453750 (U) describes on-vehicle gateway of intelligence based on many communication interface includes: a 4G communication module that the Wi-Fi communication module of Wi-Fi focus, provide ethernet network card interface the RJ45 interface, provide the wireless network deployment function of zigBee the zigBee coordinator, for the USB interface of terminal equipment power supply, for mobile unit provides data communication's the serial ports communication module and the modem of access carrier network is provided, a LAN is establish into to Wi-Fi network card, RJ45 network card, USB network card to the load is to the linux system in, and the long-range network card equipment as linux with data communication, 4G communication module is managed through built-in application of linux to zigBee coordinator and serial port communication module, through the routing management. The utility model discloses an aspect provides the access to mobile unit and other smart machine in the car, and on the other hand can be through wireless operator internet access internet.

KR20070027324 (A) describes an inner vehicle communication system and a gateway are provided to construct a CAN(Controller Area Network) communication system by using existing electrical components as they are, and to reduce weight of wires equipped inside a vehicle, thereby improving fuel efficiency of the vehicle. A CAN communication group (10) is composed of CAN buses (HS_CAN_HI, HS_CAN_LO, LS_AN_HI, LS_CAN_LO) and a lot of electrical components (11-16) connected to the CAN buses (HS_CAN_HI, HS_CAN_LO, LS_AN_HI, L_S_CAN_LO). A general electric wire communication group (30) is composed of general electric wires and a lot of electrical components connected to the general electric wires. A gateway (50) is connected between the CAN communication group (10) and the general electric wire communication group (30), and carries out a protocol relay function.

SUMMARY OF THE DISCLOSURE

In one example, there is disclosed a configurable management system for a vehicle, including:
a receiving unit adapted to receive a message associated with a vehicle resource from a communication network of the vehicle;
a control unit adapted to determine a vehicle resource associated with the received message;
an integration unit comprising an external network connected to the control unit and the integration unit further comprising at least one node, wherein the at least one node is configured to send an external message on the external network to the control unit;

wherein the control unit converts the external message to a suitable message that is sent to the vehicle resource.

In another example, there is disclosed a configurable management device, comprising:
a receiving unit adapted to receive a vehicle message associated with a vehicle resource from a communication network of the vehicle and to receive an external message from at least one node on an external network;
a control unit adapted to determine the vehicle resource associated with the received message;
wherein the control unit converts the external message to a suitable message that is sent to the vehicle resource.

In a further example, there is disclosed a method for configuring a vehicle management system, the method comprising:
receiving a message associated with a vehicle resource from a communication network of the vehicle;
determining the vehicle resource connected to a communication network of the vehicle;
receiving a control message from a node at a control unit, wherein the node is connected to the control unit through an external bus;
converting the control message into a resource message at the control unit; and
sending the resource message to the vehicle resource.

Highly on wish configurable management system for a vehicle, with preprogrammed and on wish expandable critical functionalities that may be trigger by the system when predetermined scenarios are present and/or by order of the operator of the system, said management system be integrable in a physical component of the vehicle and the predetermined scenarios being based on critical parameter collected from the state of the vehicle and or related to parameters external to the vehicle.

An emergency vehicle including the management system previously defined. For example, emergency vehicle including: a) emergency lighting equipment; b) emergency signaling equipment (siren); d) computer to install applications for specific job; d) Telemetric algorithm to manage the fleet and help user work; e) communication network; f) one or more controller(s) to manage the system; g) interface to control emergency equipment.

Manufacturing processes of the previously defined management system.

Uses of the previously defined management system for improving performance of emergency vehicles.

BRIEF DESCRIPTION OF THE DRAWINGS

The following drawings represent in a non-limitative manner, examples of the present disclosure.

DETAILED DESCRIPTION OF THE DISCLOSURE

Figure 1:
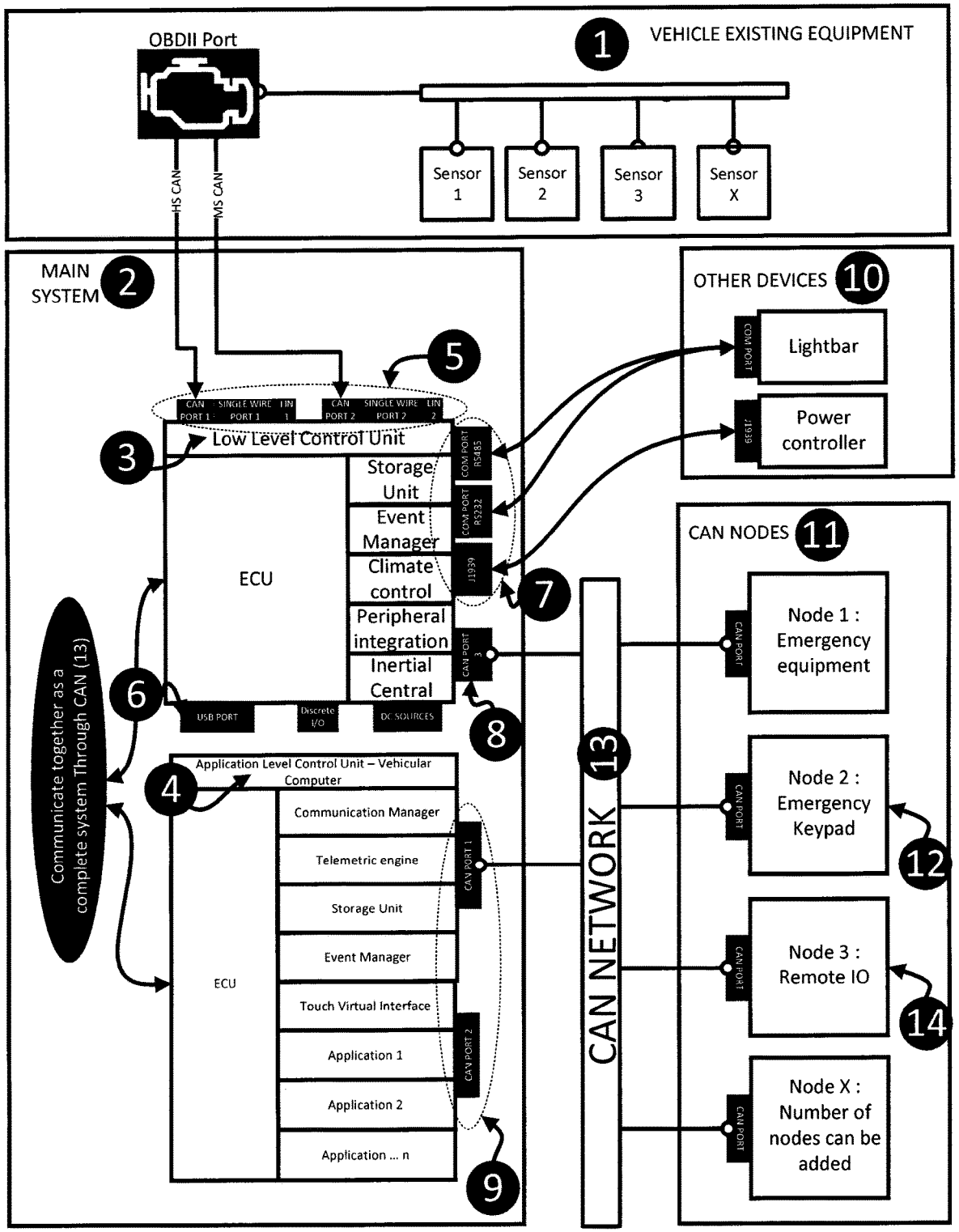
FIG. 1 is a block diagram of a configurable management system according to one example.

The following embodiments represent in a non-limitative manner, examples of the present disclosure.

Definitions

Below are terms used in throughoutt the disclosure.

Emergency vehicle (EV): An emergency vehicle can be any vehicle that is designated and authorized to respond to an emergency in a life threatening situation. These vehicles can be usually operated by designated agencies, often part of the government, but also run by charities, non-governmental organizations and some commercial companies. In the emergency vehicle category, we also include any vehicle, part of a fleet, requiring connected application to a network, intervention vehicles with special functionalities and connected to a coordination center.

On board computer (OBC): This is a computer installed into a vehicle with installed applications to help the vehicle do his job.

Electronic control unit (ECU): A term for any embedded system that controls one or more of the electrical systems or subsystems in a motor vehicle.

Low level controller unit (LLCU): This is a system doing the gateway between the vehicle CAN network and aftermarket equipment installed into the vehicle, working as a complete system with the ALCU. For example, this system collects data from the sensors of the vehicle, triggers action on different nodes based on preconfigured events, stores the configuration of the whole system, climates control of the vehicle, and integrates other peripherals of the system.

Application level controller unit (ALCU): This is an application installed into the OBC working as a service. It is working in combination with the LLCU and is responsible of user interaction, communication, storage of data, and specific applications installed by the client.

Controller area network (CAN): A Controller Area Network (CAN bus) is a standard designed to allow and devices to communicate with each other in applications. It is designed originally for electrical wiring within automobiles, but is also used in many other contexts.

Single wire CAN (WCAN): The SAE J2411 single-wire specification is for CAN network applications with low requirements regarding bit rate and bus length.

Local Interconnect Network (LIN): Le bus LIN (Local Interconnect Network) is a serial bus system used in motor vehicles. The LIN bus specification is established by the LIN consortium. The first version was made in 1999. The specifications have since evolved to arrive at Revision 2.2 (31 Dec. 2010) and it is now being standardized to ISO.

Serial Port RS232 (RS232): In, RS-232 is a for transmission of data. It formally defines the signals connecting between a DTE ( ) and a DCE.

Serial Port RS485 (RS485): RS-485, also known as TIA-485(-A), EIA-485, is a standard defining the electrical characteristics of drivers and receivers for use in systems. Electrical signaling is and multipoint systems are supported.

USB Port (USB): USB, short for Universal Serial Bus, is an initially developed in the mid-1990s that defines the cables, connectors and communications protocols used in a for connection, communication, and power supply between and electronic devices.

Discrete Input-Outputs (GPIO): Digital inputs and outputs and analog inputs available on the LLCU to control external devices or monitor an external voltage.

Inertial central (IC): Function of the LLCU to measure acceleration in the vehicle and measure gyroscopic data.

Communication manager (COMMAN): Function of the ALCU to monitor the communication network and ensure that the communication is available.

Telemetric engine (TE): Engine into the ALCU to share data collected from the LLCU, directly into the ALCU or from a remote location. The engine can store the data locally, share it with another application installed in the ALCU, or send it remotely through its communication network.

Storage unit (SU): Parts of the LLCU and ALCU, ability to store data collected locally or remotely.

Event manager (EM): Module of the LLCU and ALCU configured to monitor an event and execute an action when it occurs.

Touch virtual interface (TVI): Touch screen interface of the OBC.

Application 1, 2, . . . , n (APP1, 2, . . . ): External applications installed in the OBC and controlled by the ALCU.

Light bar (LB): Emergency light bar installed on the vehicle.

Power Controller (PC): External device controlled by the LLCU to: distribute power to added equipment of the vehicle, control added lighting equipment, manage vehicle battery health by shedding equipment based on configured conditions, notifying any power failure to LLCU, and manage other logical conditions configured in the LLCU.

Node (Node): CAN device connected to the CAN network.

Configurable Management System

In one example, the control unit matches the vehicle resource to a control output.

In one example, the control unit sends the suitable message to the vehicle resource through the control output.

In one example, the control unit activates or deactivates the control output.

In one example, the control unit sends an outcoming message to the vehicle resource based on preconfigured events.

In one example, the control unit monitors an event associated with the vehicle resource.

In one example, the control unit is further adapted to receive a control message associated with a vehicle control.

In one example, the control unit reconfigures the control message to control a new vehicle resource.

In one example, the vehicle resource comprises a control unit of the vehicle.

In one example, the communication bus comprises a controller area network (CAN bus).

In one example, the receiving unit comprises at least one first port for connecting the configurable management system to the communication network and wherein the at least one first port has a controllable connection speed.

In one example, the receiving unit comprises at least one second port for connecting the configurable management system to the external network and wherein the at least one second port has a controllable connection speed.

In one example, the configurable management system is detachable.

In one example, the configurable management system is portable.

In one example, the configurable management system further includes a screen. The screen is positionable in more than one position inside the vehicle.

In one example, the positions include a ceiling, a police console, a central area of the dashboard.

In one example, at least one node comprises an emergency equipment, and emergency keypad and a remote control.

In one example, the message is transmitted to a remote server.

In one example, a method for configuring a vehicle management system, includes:
receiving a message associated with a vehicle resource from a communication network of the vehicle; and
determining the vehicle resource connected to a communication network of the vehicle.

In one example, the method further includes:
receiving a control message from a node at a control unit, wherein the node is connected to the control unit through an external bus;
converting the control message into a resource message at the control unit; and
sending the resource message to the vehicle resource.

In one example, the method further includes:
receiving, at the control unit, a confirmation message from the vehicle resource, the confirmation message being associated with the resource message received at the vehicle resource;
converting the confirmation message into a node message at the control unit; and receiving the node message at the node.

In one example, there is disclosed a highly on wish configurable management system for a vehicle, mounted with additional emergency equipment, with preprogrammed and on wish expandable critical functionalities. The functionalities may be triggered by the system when predetermined scenarios are present and or by order of the operator of the system. The management system can be integrable in a physical component of the vehicle. The predetermined scenarios can be based on critical parameters collected from the state of the vehicle and/or related to parameters external to the vehicle.

The management system includes a central control unit. The central control unit is configured to interact directly or indirectly with any other component of the system, assure universality of the communication with vehicle ECU and independently of the type of the vehicle and assure management of mission critical functionalities.

The central control unit can be configured to interact with an auxiliary unit configured to manage communication with servers external to the vehicle, and provide the operator of the system with installed applications related to desired non critical functionalities. The central control unit can control the functioning of the auxiliary unit and is capable to assure functioning of the critical functionalities of the system even when the auxiliary unit is not in operation.

In one example, the integrated management system for a vehicle is equipped at least one control means. The system includes a Low Level Control Unit (LLCU), which can be configured to collect state data from sensors of the vehicle. The state data can be accessible through at least one vehicle ECU connected to the vehicle sensors. The low level control unit can include a Storage Unit (SU) configured to store state data, system data and data generated by the system, and send the stored data to an application level control unit on request.

An ECU can manage predetermined mission critical functionalities of the system. The Application Level Control Unit (ALCU) includes a communication manager, a storage unit, an event manager, a human to machine interface (preferably at least one touchscreen virtual interface, voice command, steering wheel buttons, . . . ), n number of applications that can be added on request to the system (preferably controlled through the human to machine interface) configured to:
  a. analyze data collected by the LLCU;
  b. manage (preferably on its own or with a central server) predetermined functionalities of the system;
  c. manage the communication between the ALCU to at least one server;
  d. storing data coming from application, internal sensors or external sensors (through LLCU);
  e. transfer the state data collected locally or from the LLCU to at least one remote server, configurable on event base or periodic time;
  f. trigger events (event or combination of events will generate activation of a physical node controlled device and/or human to machine notification message) when critical logical combination of collected data are present, and/or when an order came from operator.

The LLCU and ALCU are configured to operate together (as an active part of the system). The triggering events are generated by the LLCU and/or the ALCU. The LLCU is informed of the state of the ALCU events and vice versa. The mission critical events are generated by the LLCU. The application level events are generated by the ALCU (like state button change, bring an application to the screen, close the screen, stop the ALCU, change display brightness . . . ) Following an event or combination of event (from LLCU, ALCU, or both), the combination of both control units (system) is configured to activate a physical action or put the system to a configured state.

The LLCU is responsible of the low level information coming from the vehicle data sensor's collection and can be configured to share this information with the ALCU with a proprietary protocol, through the CAN network (see for example FIG. 1, #13) (this is important because the system can be installed into a different type of vehicle with only a minor configuration into the LLCU). The LLCU can also be configured to integrate third parties equipment through the CAN port or RS232/RS485 port. It also provides embedded sensors (such accelerometer) to share with the ALCU. This module also offers controls to adjust the climate into the vehicle.

The integrated management system for an emergency vehicle can have a dash integrated screen. The dash integrated screen can pivot. The dash integrated screen can be an extension of the dashboard. The dash integrated screen can be an extension of the steering wheel. The system can include a low level control unit configured to collect information on vehicle sensors, and accessible through vehicle ECU connected to vehicle sensors: The system can include: a storage unit configurable to store data collected and also configured to send the stored data to the application level control unit when online.

The system can include an application level control unit configured to:
  i. analyze data collected by the low level control unit;
  ii. manage, on its own or with a central server, predetermined vital functionalities of the system;
  iii. manage the communication from the computer to the backend;
  iv. store data coming from application, internal sensors or external sensors (through Low level Control Unit).
  v. transfer the sensors data collected locally or from the Low level control unit to a remote server, configurable on event base or periodic time;
  vi. trigger events based on sensors states (internal or external), installed application interaction; and
  vii. display and control through a virtual touchscreen interface The storage unit can be a data logger for logging information coming from the captor and from the ECU and/or coming from peripheral equipment connected to the system. The storage unit can be part or separated from the calculation unit.

The system can have a vehicular computer. The computer can be configured at hardware and/or software level. The specific emergency equipment can be configured to be managed by the operator of the system. The specific emergency equipment can be configured to be managed on the computer.

The screen can be a touch screen. The screen cab display graphics of the emergency equipments. For example, an emergency light and siren controller can be a key pad or can be a graphic on the screen.

The system can allow the complete integration in the vehicle of a communication protocol, such as a CAN engine, or of serial ports and allowing messages from the ECU to be analyzed by the system and to result in instructions to activate existing functions and new functions and functions that may be activated, from an external system by remote control.

The system can include two separate master nodes communicating together as a complete system; and also communicating with slave nodes like light bar, keypad, etc. The first one is a computer running a commercially available operating system. The role of that node is to manage the graphical interface for the operator showing important information, vehicle state, application state, communication state. For example, the event manager can be running as a Windows service and includes the CAN, RS232, RS485, USB and Ethernet message analyzing engine. The second node is controlling vital functions of the emergency vehicle such as siren, lighting system and power management of the added vehicle equipment. This node also contain an event manager at low level programming that permit integration of different peripherals using different communication protocols such as CAN, LIN, SWCAN, RS232, RS485, USB or Ethernet. It buffers information coming from the vehicle CAN bus and emergency equipment to send it as a report to the vehicle computer. This node is also controlling the car heating control (HVAC) offering control buttons.

The system can allow the operator to add new applications. The system can allow the operator to select command button allowing digital interaction with a specific application. The system allows the operator to select a physical button and or digital button on the screen to interact with the application.

The present system is adaptable to any commercial vehicle communicating using a CAN, LIN and SWCAN protocols. The system can offer controls to already present functionalities such as climate control of the vehicle.

In the following paragraphs, we will refer to the drawings in more details.

FIG. 1 illustrates a vehicule management system according to one example.

Figure 2:
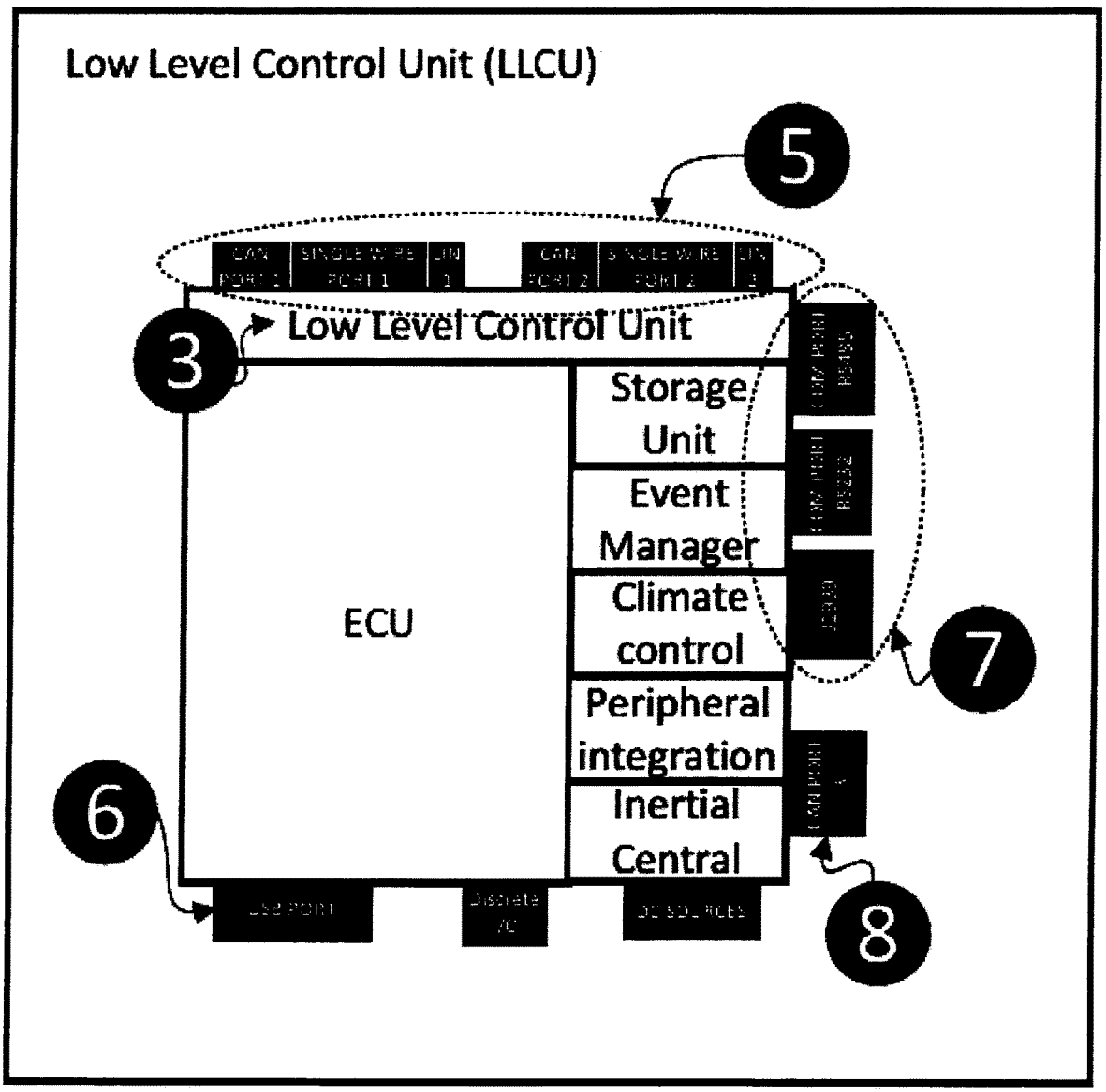
FIG. 2 is a detailed view of a Low Level Control Unit (LLCU) according according to one example.
Figure 3:
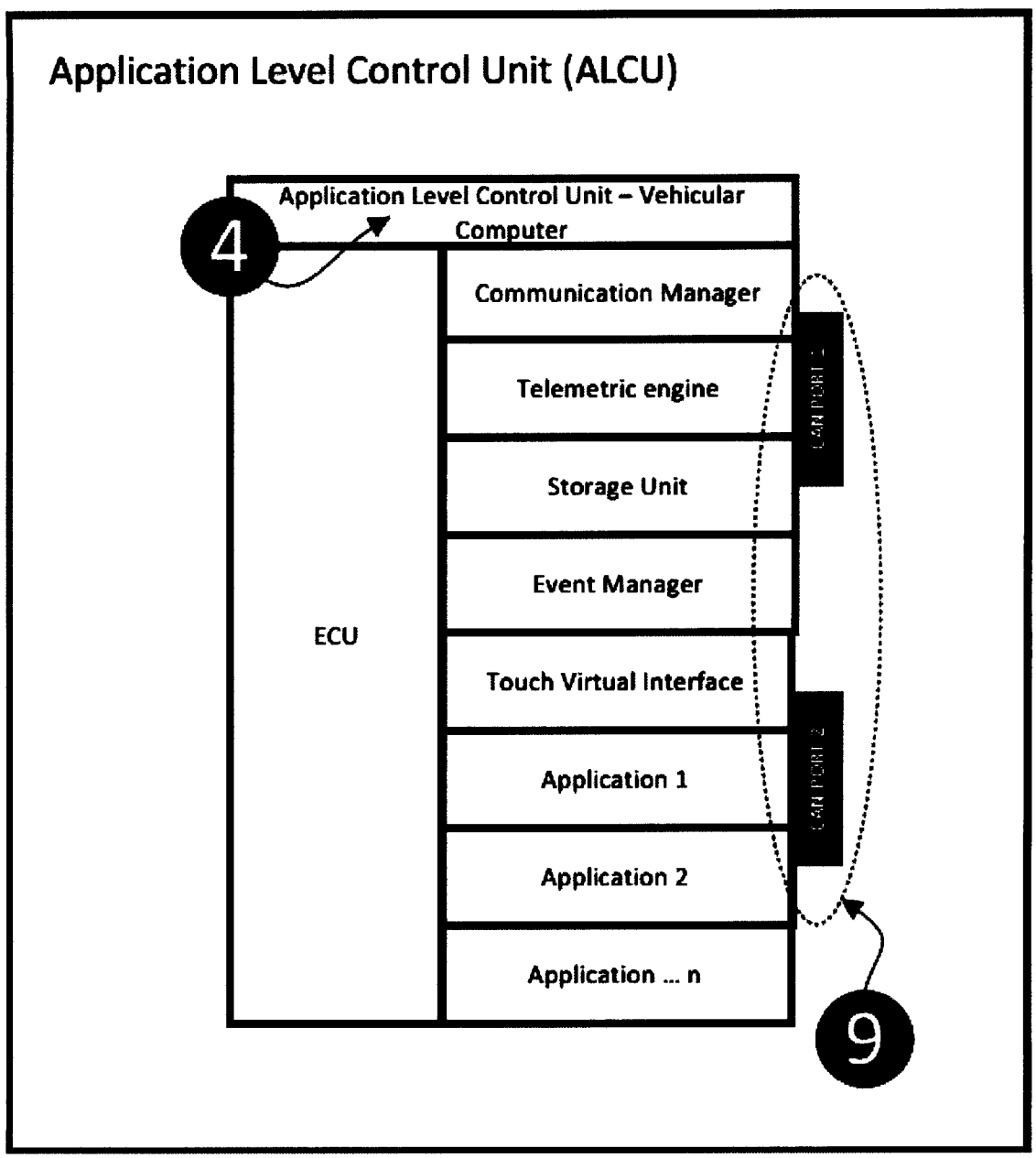
FIG. 3 is a detailed view of an Application Level Control Unit (ALCU) according to one example.

Below is shown an interaction and description table, useful for the understanding of FIGS. 1, 2 and 3.

| Bloc # | Interact with # | Description |
|---|---|---|
| 2 | 1, 10, 11 | The system includes the ALCU and the LLCU. For example, they can work together and are communicating using a network 13 (for example, a CAN network) (FIG. 1, #13) with bloc 11, and with other serial equipment (integrated with their own protocol) through serial ports or J1939 network. |
| 3 | 4 | The LLCU and the ALCU are communicating together depending on the responsibility of each one to collect specific data. |
| 5 | 1 | The LLCU contains 4 CAN ports facing the vehicle network. Those ports are isolated with other ports of the LLCU with logical rules, as a gateway. Those ports are read only to prevent problems with the vehicle integrity, except for the encoding of the climate control buttons done by the LLCU. |
| 8 | 9 | The LLCU and the ALCU are communicating together through those CAN ports. |
| 7 | 10 | Those ports are used to communicate with other equipment to control them. Decisions are took in the LLCU, and bloc 10 devices are controlled through bloc 7 ports. |
| 8 | 11 | ALCU interacts with bloc 11 devices through the proprietary CAN port (bloc 8). Bloc 11 may contains many devices, like remote IO to control electrical devices, keypad to enable physical buttons and indicators to interact with the user, and other CAN devices from other manufacturers. |
| 6 | External devices | This USB port is used to configure the product or gather data from an external device, like a GPS. |

The vehicle configurable management system 2 is connectable to a vehicle CAN, LIN or SWCAN network, giving it access to vehicle sensors, designated generally as vehicule existing equipment 1. The system 2 may be detachable.

As shown in FIG. 1, the configurable management system 2 is connected to existing equipments of a vehicule 1 through a vehicle management network.

The existing equipments of the vehicule 1 can include one or more vehicule resources. The vehicule resources can include the central control module (CCM), the central timing module (CTM), the general electronic module (GEM), the body control module (BCM), the suspension control module (SCM), the door control unit (DCU), the engine control unit, the electric power steering control unit (PSCU), the powertrain Control Module. (PCM), the seat control unit, the speed control unit (SCU), the telematic control unit (TCU), the transmission control unit, the brake control module (BCM; ABS or ESC), the battery management system.

Referring to FIG. 1, the existing equipments include sensors (Sensor 1, Sensor 2, Sensor 3 and Sensor X). The vehicule management network can include a CAN network. The vehicule management network gives access to the vehicule existing equipments.

Referring to FIG. 1, the system 2 include two ECU, working together as a complete system, offering the possibility to manage everything added into a car to provide an integrated system. The system consolidates every controllers of an emergency vehicle into a highly configurable system providing easy operation and configuration.

As shown in FIG. 1, the system 2 is also connected to devices 10 over serial ports or J1939 communication, designated generally by 7. Devices 10 may include light bars, siren systems, radios, speakers, computer systems, radar systems, communication systems, light systems, screens, emergency systems, etc. Devices 10 can include any system that is configured to process information from sensors.

Referring to FIG. 1, the system 2 is connected to a network 13 and to CAN nodes 11. The network 13 can be a proprietary CAN network.

The CAN nodes 11 can include emergency equipments, an emergency keypad 12, a remote IO (Input/Output). Other nodes (such as radar controllers, smoke detectors, video cameras, voice recorders, etc.) can be added. These nodes can be integrated into the system communication through the CAN network.

For example, the node 12 can be an emergency keypad. It is fully configurable. For example, it can be used to control emergency lighting and sirens. It can also be used to control any function of the system, like starting video camera recording, start an application into the computer, or any configured function in the LLCU or ALCU.

For example, the node 14 can be a remote IO (Input/Output). Any function of the system can trigger an output of this node, and we can detect a signal with its inputs. Third party devices can be integrated in network 13.

The Low level control unit (LLCU), designated as 3, can maintain the configuration of the system into his storage unit. The LLCU is a configurable integration controller and a communication gateway providing an integration with other parts of the system and integrated with protocols of other emergency equipment (10 and 11) installed into the vehicle. As it is a gateway with emergency equipment, this electronic control unit (ECU) is designed to ensure mission critical emergency function's high availability. Based on its configuration, the LLCU manages, but is not limited to: power of the equipment and low voltage disconnect functions to prevent vehicle battery discharge, communication with other peripherals to control emergency functions, communication of its information with the ALCU, described below.

The LLCU integrates an inertial central to store or share accelerometer and gyroscopic information of the vehicle. It will also integrate communication from the vehicle CAN network to get state of vehicle sensors. For example, the system will get through this network: outside temperature, transmission position, vehicle key position, door open/close status, RPM of the vehicle, speed of the vehicle, brake pedal state of the vehicle, etc. without having to add wiring.

Part of the function of this controller is also user physical interface to control climate of the vehicle. Having this ability permit to manage the idle time of the vehicle by shutting down the engine based on battery voltage and inside/outside temperature. If the systems wakes the vehicle based on low temperature, it is able to adjust the temperature to warm the cabin. For example, consolidating all those functions together will, compared to existing systems: save space, place the climate control interface at the desired position, save power, reduce wiring into the vehicle and save a lot of time to install the system.

The following user accessible ports can be provided with the LLCU:
  two (2) CAN port to be connected to the vehicle;
  two (2) Single wire CAN port to be connected to the vehicle (different standard used by vehicle manufacturer);
  two (2) LIN port to be connected to the vehicle (different standard used by vehicle manufacturer);
  one (1) RS232 port to communication with a computer or other peripheral;
  one (1) RS485 port to communication with other peripheral;

one (1) J1939 port to communicate with J1939 nodes, in this example the Power controller;
one (1) proprietary CAN port to communicate with proprietary protocol with other CAN devices;
one (1) USB port to communicate with other peripherals or used for configuration of the product;
analog I/O; and
discrete I/O.

The ALCU can be designed to consolidate without reducing functionalities, or compromising system integrity. The application level control unit, designated generally as 4, can be responsible to operate high processing tasks and interaction with the user. The ALCU can provide a unified interface to operate the system through a touchscreen virtual interface. This interface can offer intuitive big buttons to avoid user distraction and control any aspect of the system. The interface can also provide ability to control peripherals like emergency lights.

The interface can provide information like telemetric data of the vehicle or peripherals connected to it. The ALCU ECU can include:
  a communication manager, offering the ability to monitor with a 'watchdog' available communication modules installed into the OBC, and able to restart the communication in case of failure;
  a telemetric engine, able to: transmit data to a remote, share the data with other software installed in the OBC (per example, share brake position, accelerometer data, emergency light state with the camera system), or store the data in the OBC as a black box. The data can be any information in the system, like GPS information, emergency equipment state, accelerometer state, vehicle sensor state, etc. This data can be sent remotely based on (configurable): specific event occurring; distance; and time interval.
  a storage unit, able to store telemetric information, configuration, log of the system, and other information.
  an event manager, working as a complete unit with the LLCU, able to trigger any action of the system (named reactor) based on any event (named monitor) of the system. This module also permit integration with third party software, like voice commands per example;
  a touch virtual interface offering the ability to control and monitor the system. It also permit to used customer supplied applications without the need of having another OBC; and
  applications: give the ability to the customer to install his own application, and control them through the ALCU software.

Physical Installation

A typical system is equipped with the LLCU (FIG. 1, #3), installed in the dash of the vehicle, in the equipment console of the vehicle or on the roof of the vehicle.

The LLCU is connected to the automobile network of the vehicle (FIG. 1, #1). The automobile network is installed by the vehicule manufacturer and comes integrated within the vehicule. For example, the automobile network of the vehicule can be a CAN network. The LLCU can be connected to an external network. The external network can be connected to sensors, nodes and devices that are added to the vehicule. For example, the external network can be a network which has the same characteristic of a CAN network.

An on-board computer (OBC) can be installed in the vehicle, equipped with a touchscreen and a keyboard. The OBC can be connected to the LLCU.

A light bar (FIG. 1, #10) can be installed on the vehicle, and be connected on the LLCU (FIG. 1, #3) through RS232, RS484, J1939 or CAN3 port (FIG. 1, #7, #8) depending on protocol used by the equipment.

A power controller is connected to J1939 port and manage power of added equipment (light bar, siren, computer, camera system, and other nodes of the system (FIG. 1, #11), etc.). Its role can be: distributing power to other devices, shedding of equipment in case of low battery issue, transmit diagnostic to LLCU on its output state in case of failure and control of peripherals based on configured conditions.

Emergency lights can be installed on the vehicle and are controlled by the power controller (FIG. 1, #10) or remote IO (FIG. 1, #14), by the LLCU An emergency keypad (FIG. 1, #12) can be connected to the external network (such as an external CAN network) (FIG. 1, #13) to control emergency functions.

Configuration of the System

A software can be installed on the OBC. The OBC can form the ALCU (FIG. 1, #4). Applications can be installed on the OBC. The ALCU can have a Touch Virtual interface configured to start applications, or trigger any function of the system. The software in the ALCU can be built in order to gather information, and take decisions according to the configuration applied in the event manager.

The event manager of the LLCU and ALCU can be configured to offer ability to use any input of the system to activate any function controlled by the ALCU or the LLCU. For example: steering wheel buttons of the vehicle are communication through the CAN network of the vehicle (FIG. 1, #1). Because we remove nodes of the vehicle controlled by those buttons, we are able to use the signal of those buttons to do something else. Pressing those buttons is generating CAN messages on the vehicle CAN network and is seen by the LLCU event manager through its interface with the vehicle (FIG. 1, #5). The LLCU is configured to send this message through the Can port 3 to the ALCU. The ALCU can then be configured to: start an application in the OBC; maximise an application in the OBC; and toggle the application displayed on the screen of OBC, doing a carousel with open applications.

From the emergency keypad (FIG. 1, #12), the emergency lights and siren can be started, and at the same moment, an application can be brought to the OBC screen.

The configuration can be done several ways. For example, the configuration can be done automatically by the system. For example, the configuration can be done:
  i. LLCU:
    Through a computer connected to the CAN3 port of the LLCU (FIG. 1 #8);
    With a USB drive containing the configuration file connected on the USB port of the LLCU;
    Through the RS232 port connected to a laptop.
  ii. ALCU:
    Through an agent pushing the new file in a directory;
    Through the LLCU, containing the configuration of the ALCU;
    Through the configuration software.

In one example, the system is divided in two controllers assuming specific tasks: the LLCU and the ALCU. The LLCU can be responsible to manage low processing and mission critical data. It can control emergency functions and collect data from the vehicle or added components. The ALCU can be responsible for non-critical and high processing functions. The two nodes can work standalone if one or the other is shutdown.

The system can permit the user to install his own applications and integrate them to the system. The system use existing controls of the vehicle for integration without alteration.

The system is flexible and can be integrated with any vehicle. The system can be detachable.

In one example, there is disclosed a configurable management system for a vehicle. The configurable management system includes a receiving unit adapted to receive a message associated with a vehicle resource from a communication network of the vehicle. For example, the receiving unit can be the ports CAN Port 1 and Can Port 2 of the LLCU unit 3 shown in FIG. 1. As shown in FIG. 1, the receiving unit is connected to the vehicle existing equipment through a communication network, such as the CAN network. The vehicle existing equipments are the resources that were initially installed on the vehicle prior to installing the configurable management system.

For example, the vehicle existing equipments can includes sensors installed by the manufacturer of the vehicle.

The control unit can be the LLCU unit 3 shown in FIG. 1. The control unit can be configured to determine a vehicle resource associated with a message received for example at CAN Port 1 and Can Port 2. For example, when the LLCU may configured to connected to the CAN network on different car manufacturers. As each manufacturer uses a different standards, protocols, transmission speed and message types to communicate over a CAN network, the LLCU may be program to receive messages on the CAN network and identify the vehicle resource associated with the received messages.

The LLCU may be programmed to recognize a vehicle type by listening to messages over the CAN network. For example, after receiving a message, the LLCU may determine that this type of message is associated with MANUFACTURER A or MANUFACTURER B.

The vehicle type may also be entered by a user at this step.

A port speed CAN can then be assigned to the LLCU for ports 1 and 2 (fixed configuration). Other global settings can also be configured on the LLCU.

The LLCU can be also be configured to open a configuration file associated with the vehicule type or manufacturer. The configuration file can contain the different types of messages that are broadcasted over the CAN network for this particular vehicle type or manufacturer. Some fixed messages (watchdog or active configuration announcement) can be configured here.

Outputs of the control unit can be configured automatically or by the configuration file. The outputs can also be configured by a user. The control unit may determine a number of outputs to the vehicle resources. The labels of each output of the control unit may be configured.

Figures 8A, 8B:
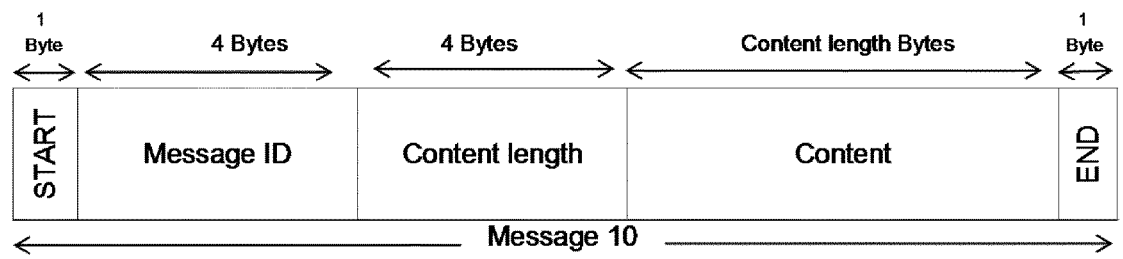
FIG. 8A shows the output of the control units and associated CAN messages according to one example.
FIG. 8B shows an example of the structure of a message.

As shown in FIG. 8A, each output of the control unit is identified. Each output of the control unit is configured to correspond to a vehicle resource that has been identified by the control unit. For example, Output 1 may be configured to activate the sirens. For example, Output 2 may be configured to activate the beacons. For example, Output 3 may be configured to supply power to an element connected to the system, such as a radar controller, a camera, etc.

For example, Output 4 (not shown) may be configured to control the air conditioning (HVAC controller). The labels of each output of the the controller may be configured. The CAN message will not be visible to the user.

The controller may adjust the messages automatically. There may be also be a way to adjust the message by software. The message may be defined by controller type used.

Referring to FIG. 8B, there is shown an example of the structure of a message. Messages that are sent to and received from the control unit can have this format. For example, Message 10, Message 11, Message 20, Message 21, Message 30, Message 31 shown on FIG. 8A can have this structure.

In one example, the structure of messages sent and received at the control unit is as follow: a beginning bit (called the "start of frame" or "start of message" bit), followed by an "identifier" code (such an 11 bit code that tells what kind of data the message contains), followed by a priority code ("remote transmission request" that says how important the data is) followed by 0 to 8 bytes (one byte equals 8 bits) of actual data, followed by some more bits that verify the information (cyclic redundancy check), followed by some end of message bits and an "end-of-frame" bit.

The control unit may be configured to activate its output when the content of a message (such as a matching bit or byte) at the output is activated. For example, when the bit falls to 0, the output will be disabled. The controller may send one message per second with the state of the vehicle resource.

If a change occurs, the controller immediately sends the message reflecting the changes. For example, the controller may respond to the Message 10 (with a content 0X0101) with another message (Message 21). Message 21 responds with the status of the Output 1.

The controller inputs may also be configured. Each input may corresponds to a button or physical entry on a controller. It can also correspond to a particular CAN message received on the external network. Each button will receive a label and can activate an output. Each button can also activate a function. Each button can be used in a logic function block. Non-mechanical inputs can be configured and may be based on predefined CAN messages (e.g. the state of a vehicle door).

A function can be a reaction to certain state configured in the system. When a predefined state or combination of state occur, it will start a function. For example, there might be a function for starting the lightbar in a certain mode, starting perimeter lighting, transferring the siren to the horn of the vehicle, controlling the GPS application, controlling the computer and the display, starting the video recording, and sending a message to a remote server to inform the status of the vehicle. The controller may configure functions and relationships between inputs and outputs. Examples of functions are shown in the table below:

| Functions | Description |
|---|---|
| Control group | This function can be used to assign multiple outputs with a single input (enable or disable outputs or other functions). For example, when starting the emergency mode, it will also start the rotating beacon, the corner lights, the siren, etc., which are on different outputs. Or, different function will be activated, other actions can be performed on deactivating this function. |
| Logic | Using simple instructions, this function will be enabled to a decision based on a logical operations. For example, state = (input 1 AND input 2) OR input 3. |

-continued

| Functions | Description |
|---|---|
| Jettison stage 1 | Disable configurable outputs if the battery drops below a certain configurable level. The outputs will be activated if the battery rises to configurable level. |
| Jettison stage 2 | Disable configurable outputs if the battery drops below a certain configurable level. The outputs will be activated if the battery rises to configurable level. |
| Jettison stage 3 | Disable configurable outputs if the battery drops below a certain configurable level. The outputs will be activated if the battery rises to configurable level. |
| Tinier 1 | Configurable timer (on delay, off delay) for use in the same logic. |
| Tinier 2 | Configurable timer (on delay, off delay) for use in the same logic. |
| Tinier 3 | Configurable timer (on delay, off delay) for use in the same logic. |
| Always ON | A function that will enable outputs always active. Only the jettison will make it possible to close the exits. |
| ETC. | ETC. |

These are examples of functions that can be configured in the system. These functions can be related to the controller itself. These are tools in the software helping to program the behavior of the functions. For example, we have timers that can help to configure a off delay for a specific function. For example, when we stop the lightbar, we want the camera to continue recording for 15 seconds. In this case, we will combine a timer function to the output.

Function may be automatically defined on nodes that are connected to the external network. When an action occur, the system can automatically trigger an output on a specific node.

Each output of the controller may be associated with a function. This association may be configured automatically by the controller. The configuration file may also carry this task.

For example, each output can be associated with a bit of a CAN message, for example, of 4 bytes or 8 bytes, or any number of bytes as necessary. For example, if one of the bits is set to 1, the output will be activated.

As for another example, the message can have the format shown in FIG. 8B.

For example, the control unit may identify a message on the CAN network associated with the buttons of the vehicle steering wheel. Then, the control unit may reconfigure the buttons by associating each button with a different function. For example, the control unit may associate the buttons with a specific CAN message.

For example, each button of the emergency keyboard and the position of the lever may be associated with a function.

As another example, there may a screen or an interface on the node. Each button of the interface can be associated with a function. The interface may also be used to configure a software on the control unit and the external network. For example, to configure these functions, an XML page can be created and may be used to store the configuration rules.

Each input of the control unit can be associated to a CAN message and can be associated with a function. An example of a function is mode 911, which can for example trigger eight (8) outputs of the control unit.

It may be possible to put an output in 'ALWAYS ON' mode to power equipments. Off delay timers can be configured. The main function may be to close the outputs, for example, sixty (60) minutes after the ignition is closed.

The configured information on the control unit may be displayed in visual form to validate the configuration. For example, a button on the interface, the "APPLY CONFIGURATION" button, may be used to apply the configuration to the control unit. A virtual keyboard, may also be configured to control the system.

An integration unit is also provided with the system. The integration unit includes an external bus connected to the control unit. The integration unit further includes at least one node or multiple node. Referring to FIG. 1, the integration unit may include node 11. For example, the virtual keyboard may be a node of the integration unit. The nodes are configured to send an external message on the external bus to the control unit. For example, the virtual keyboard may send a message to the control unit via the external network. The external network may be a proprietary CAN network.

The control unit receives external messages from the nodes and converts the external message to a suitable message that is sent to the vehicule resource. For example, the control unit matches the vehicle resource to a control output and the control unit sends the suitable message to the vehicle resource through the control output.

The control unit can activate or deactivate the control output.

In one example, the control unit sends an outcoming message to the vehicle resource based on preconfigured events. The control unit can monitor an event associated with the vehicle resource.

The control unit is further adapted to receive a control message associated with a vehicle control. The control unit reconfigures the control message to control a new vehicle resource. The control unit is able to reconfigure the control message to control a new vehicle resource. For example, the control unit may identify message on the CAN network associated with the buttons of the vehicle steering wheel.

The buttons of the vehicle steering wheel are examples of vehicle controls. For example, the manufacturer of a vehicule may configure the button of the steering wheel to control the radio. However, the control unit may reconfigure the vehicle controls, such as the buttons of the steering wheel. The control unit does so by identifying the CAN messages associated with the vehicle controls and assigning the identified CAN message to a different function. For example, the control unit may reconfigure the buttons of the steering wheel to activate the siren or the emergency controls.

The configurable management system may include one or more screens that are positionable in more than one positions inside the vehicle, such as in the ceiling, the console, or a central area of the dashboard.

The control unit may receive a message associated with a vehicle resource from the communication network of the vehicle; and determine and identify a vehicle resource connected to a communication network of the vehicle. The control unit may also receive a control message from a node connected to the control unit through an external bus. Then the control unit converts the control message into a resource message. After that the control unit sends the resource message to the vehicle resource though the existing vehicle network, such as the manufacturer CAN network installed on during the manufacturing process of the vehicle.

Once the message is received at the vehicle resource, the vehicle resource sends a confirmation message to control unit. The confirmation message may be an indication of the status or change of status of the vehicle resource. The control unit can convert the confirmation message to the right format to be transmitted to the appropriate node on the external network.

Referring to FIGS. 4-7, there is disclosed systems and methods for sending messages and confirming messages on the vehicle management system.

Figure 4A:
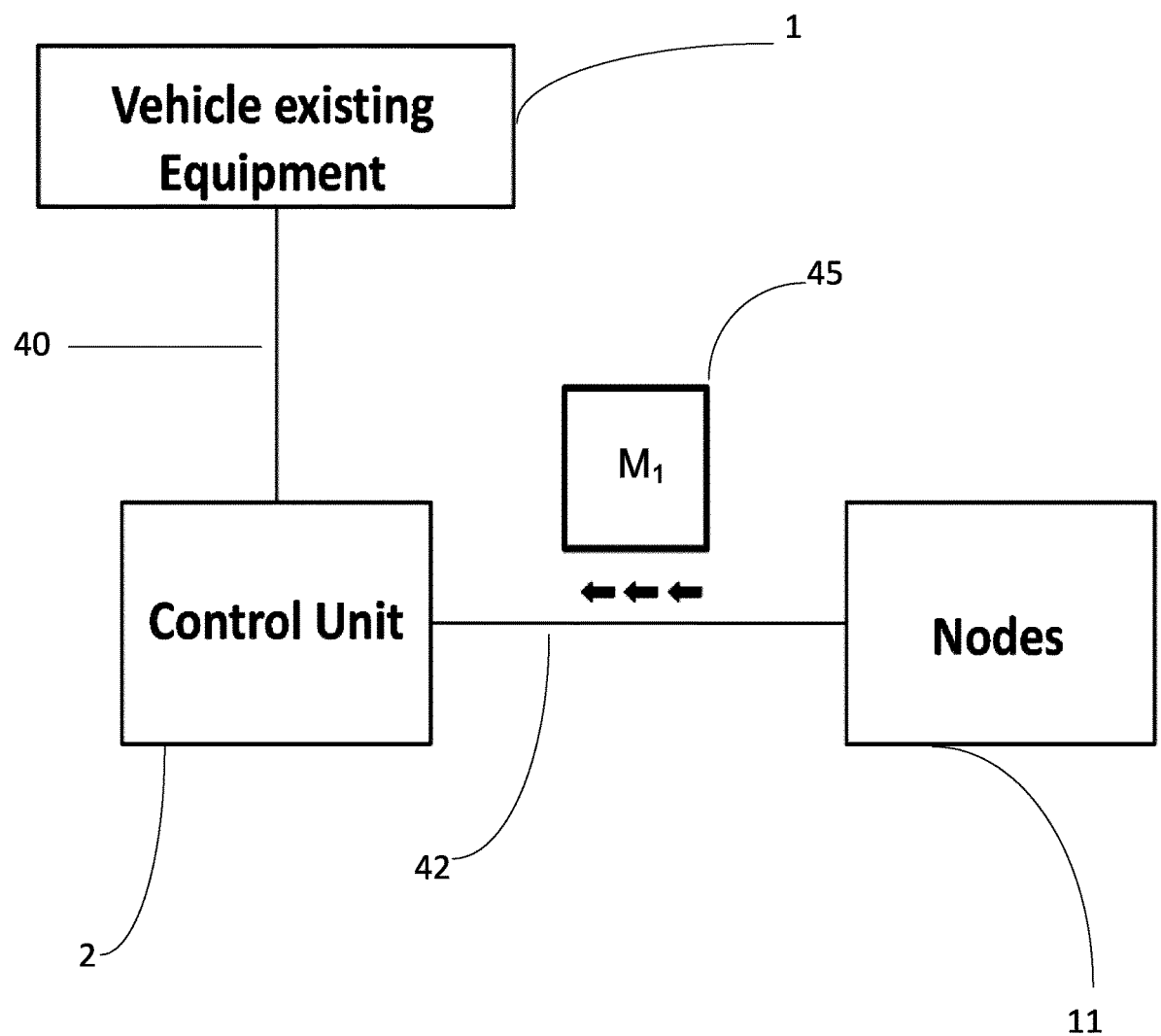
FIGS. 4A, 4B, 4C and 4D show a method for sending messages and confirming messages on the vehicle management system according to one example.
Figure 4B:
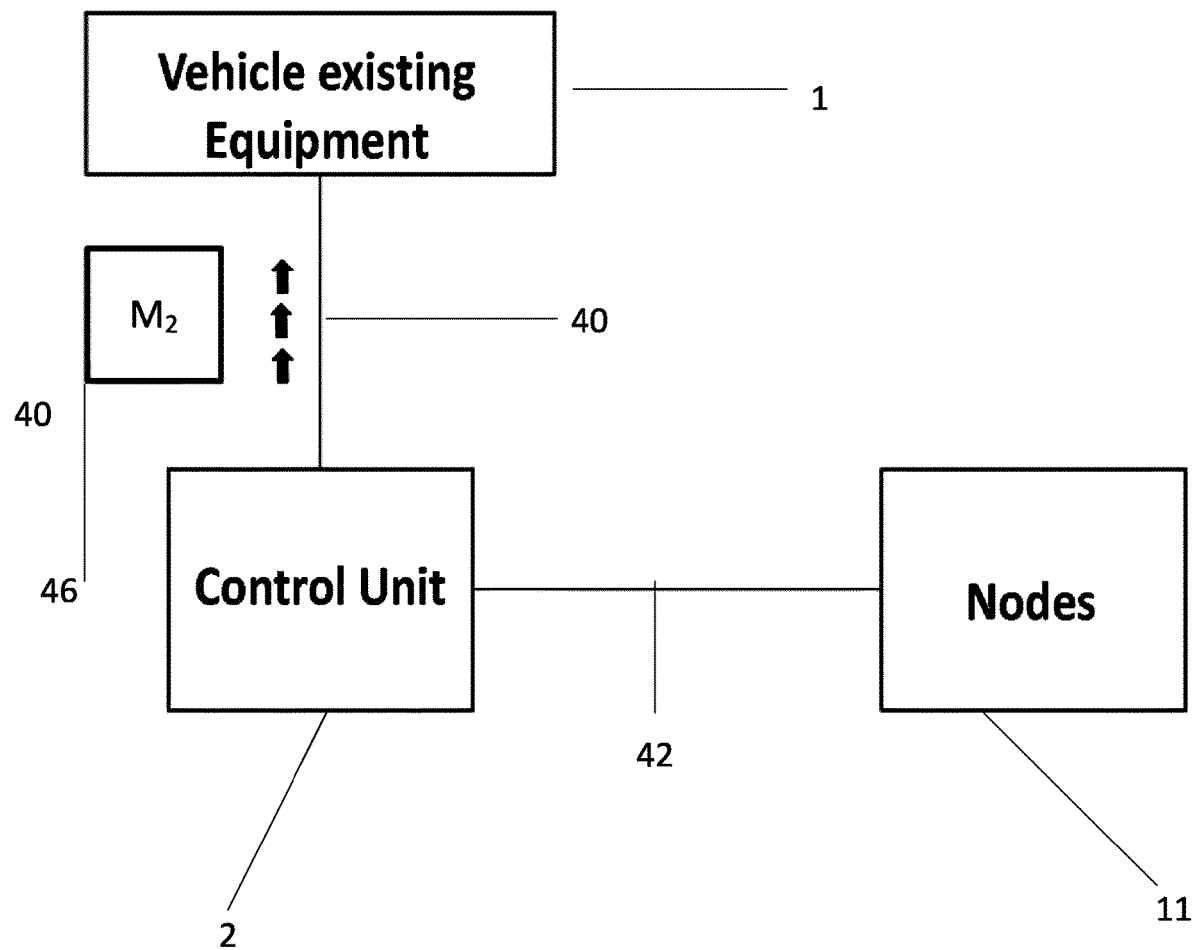

For example, as shown in FIG. 4A, the control unit is connected to the vehicle existing equipment through the network 40. The control unit is connected to the nodes through the network 42.

The control unit can transmit message to the vehicule existing equipments. For example, the control unit can transmit message or climate control nature to the vehicle such as set the temperature, fan, A/C, position, etc.

A vehicle equipment (such as a button on the steering wheel) can send a message to the control unit. For example, the flow of the message is the following: function initiated from a vehicle existing equipment sensor change:
i. Coming from the vehicle to the control unit: This is the state of all sensors in the vehicle that we use to control. It is read only. Can come from 2 different CAN network from the vehicle (including LIN, CAN, and signle wire CAN communication ports).
ii. Based on state of the sensors or buttons (from the vehicle), LLCU will send message (based on programmed functions into LLCU) to ALCU, nodes and other devices to set their outputs.
iii. The nodes, ALCU or other device will respond a message to the LLCU with a message showing the state of its output.

For example, as shown in FIGS. 4A, 4B, 4C, and 4D, the control unit is connected to the vehicle existing equipment through the network 40. The control unit is connected to the nodes through the network 42. The network 42 can use a proprietary protocol.

For example, the nodes 11 can send a message to the control unit if there is an input change (physical input, button press, . . . ). The changes can be to control the devices 10 or to vehicle existing equipments 1, which are connected to the control unit. The task of the control unit is to guide the received message to the right sensor or device.

Examples of Flow of Messages

Example A. Flow of Message—Function Initiated from a Vehicle Existing Equipment Sensor Change i. Coming from the vehicle to the control unit: This can be the state of all sensors in the vehicle that we use to control. It can be read only and can come from 2 different CAN networks from the vehicle (including LIN, CAN, and signle wire CAN communication ports).
ii. Based on state of the sensors or buttons (from the vehicle), LLCU will send a message (based on programmed functions into LLCU) to ALCU, nodes and other devices to set their outputs.
iii. The nodes, ALCU or other device will respond a message to the LLCU with a message showing the state of its output(s).

Example B. Flow of Message—Function Initiated by the LLCU Requesting a Vehicle Temperature Change i. Coming from the the control unit to the vehicle: The LLCU sends a message to the vehicle requesting to change the climate into the vehicle.
ii. The vehicle controller apply the change, and respond to the LLCU showing a message with the encoding of the actual state of the vehicle climate setting.
iii. The LLCU will display on its interface the change, and can send to other devices a message to notify the change, depending on LLCU configuration.

Example C. Flow of Message—Function Initiated by the Control Unit to the Nodes and Other Devices i. Coming from the control unit: The control unit sends a message to the node(s) and/or other devices requesting to set its outputs or display to a certain value, based on control unit configuration.
ii. The nodes or other devices will apply the change request, and will send back a message to the control unit confirming the change.
iii. Messages from this scenario might not be transmitted to the vehicle.

Example D. Flow of Message—Function Initiated by the Nodes or Other Devices Going to the Control Unit i. Coming from the nodes or other devices: if there is an input change (physical input, button press, . . . ), the nodes or other devices will send a message to control unit
ii. The control devices will activate the associated function, based on the configuration of the control unit.
iii. The control device will send messages to nodes and other devices to set their outputs, based on the configuration.
iv. The nodes and other devices will apply the changes and send a message to the control unit to confirm the change.
v. Messages from this scenario might not be transmitted to the vehicle.

As shown in FIG. 4A, a node 11 can send a message M1 to the control unit 2 through network 42. The network 42 can be a proprietary network. The network 42 can be a network that is external to the vehicle network. The network 42 can be an external bus. The network 42 can be a network controlled by the control unit. For example, the network 42 can be managed by the control unit. For example, protocols on the network 42 can be set up by the control unit.

For example, the node can send a message to the control unit if there is an input change (physical input, button press, . . . ). For example, the content of Message M1 can be a request to change the temperature inside the vehicle. At FIG. 4B, the control unit receives message M1 and converts it to a suitable message M2 that is sent to the vehicle resource (or existing equipments). For example, the LLCU at the control unit sends a message to the HVAC controller requesting to change the temperature inside the vehicle.

In order to keep the universality with multiple vehicle manufacturers and brands (such as vehicles from Manufacturer A, vehicles from Manufacturer B, Manufacturer C, etc.), the ALCU and/or other nodes (such as emergency equipment, emergency keypad, remote IO, etc.) communicate with the same protocol with the LLCU. Therefore, the messages (based on commands) sent by the ALCU and/or these nodes to the LLCU can have the same format.

When the LLCU sends these messages (from the ALCU and the nodes) to the vehicle and/or vehicle resources, it converts the messages to the specific message format of the vehicle that the LLCU is connected to. For example, to accomplish this task, the LLCU can have a message conversion table that become active based on vehicle type configured in the system. For example, when the LLCU receives a message from a node (such as the emergency keypad, etc.) and such message is destined to a vehicle resource (such as a request to the HVAC controller), the LLCU will convert the node message to a suitable message that can be understood by the vehicle resource.

For example, to do this, the LLCU identify the conversion table for this particular vehicle, identify the message format for the specific vehicle message, change the format of the node message to a suitable message format that can be understood by the vehicle resource. For example, the LLCU may include the address and specific instructions associated to the particular vehicle resource in the suitable message. For example, the specific format of the vehicle resource may require that the LLCU builds a suitable message by changing the node message by changing the beginning bit(s) or byte(s), the "start of frame" bit(s) or byte(s), the start of message" bit(s) or byte(s), the "identifier" bit(s) or byte(s), the priority bit(s) or byte(s), the remote transmission request bit(s) or byte(s), the bit(s) or byte(s) of the actual message (into instructions that can be understood by the vehicle resource), the cyclic redundancy check bit(s) or byte(s), the end-of-frame bit bit(s) or byte(s), etc.

In the same way, when the LLCU receives a message from a vehicle resource and such message is destined to a particular node or device(s), the LLCU will convert the vehicle resource message to another message that can be understood by the node or the device. For example, the LLCU can use a conversion table, which may be the same as described above. For example, the specific format of the node may require that the LLCU change format of the message of the vehicle resource, by changing the beginning bit(s) or byte(s), the "start of frame" bit(s) or byte(s), the start of message" bit(s) or byte(s), the "identifier" bit(s) or byte(s), the priority bit(s) or byte(s), the remote transmission request bit(s) or byte(s), the bit(s) or byte(s) of the actual message (into instructions that can be understood by the node), the cyclic redundancy check bit(s) or byte(s), the end-of-frame bit bit(s) or byte(s), etc.

Figure 4C:
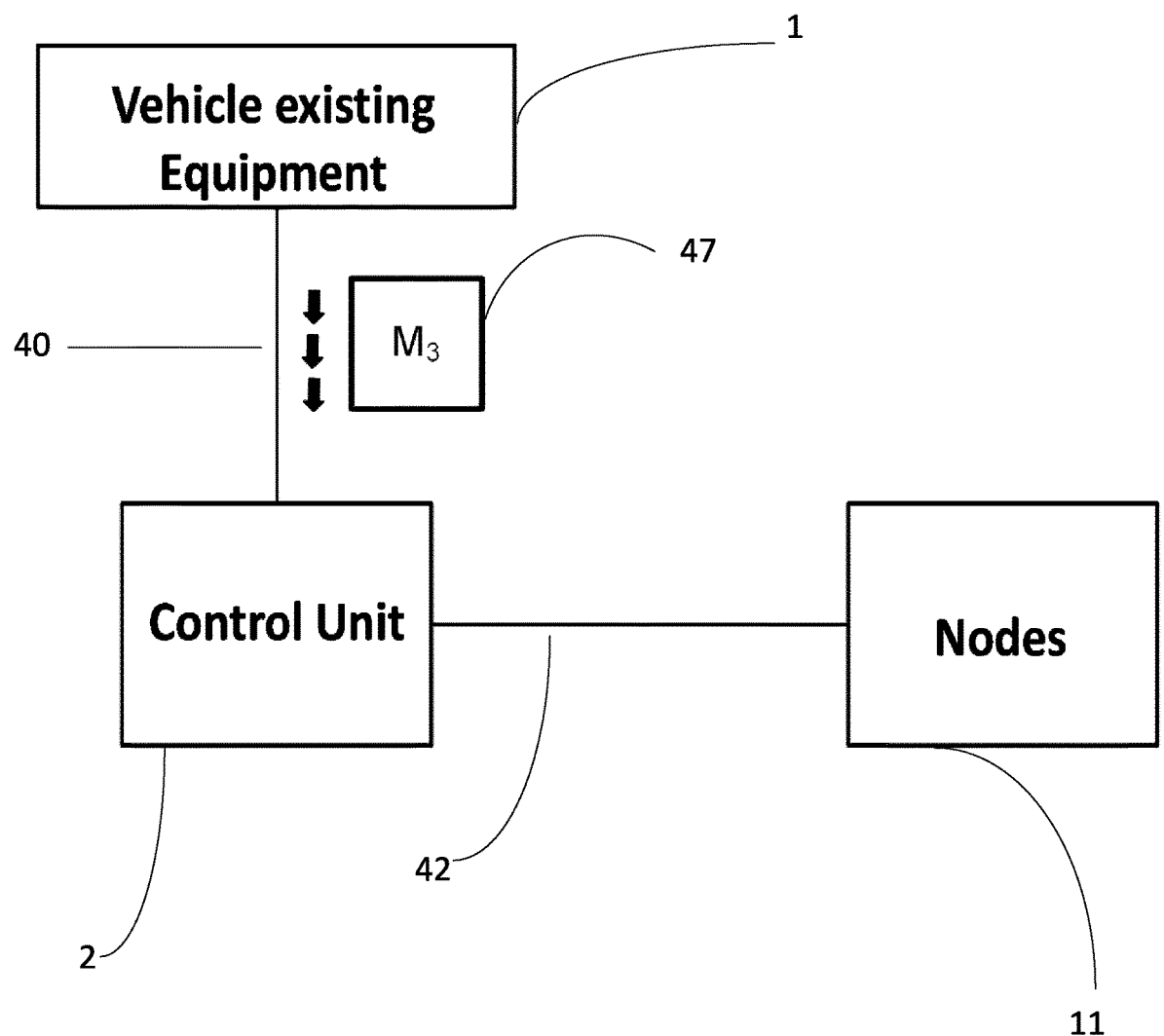
Figure 4D:
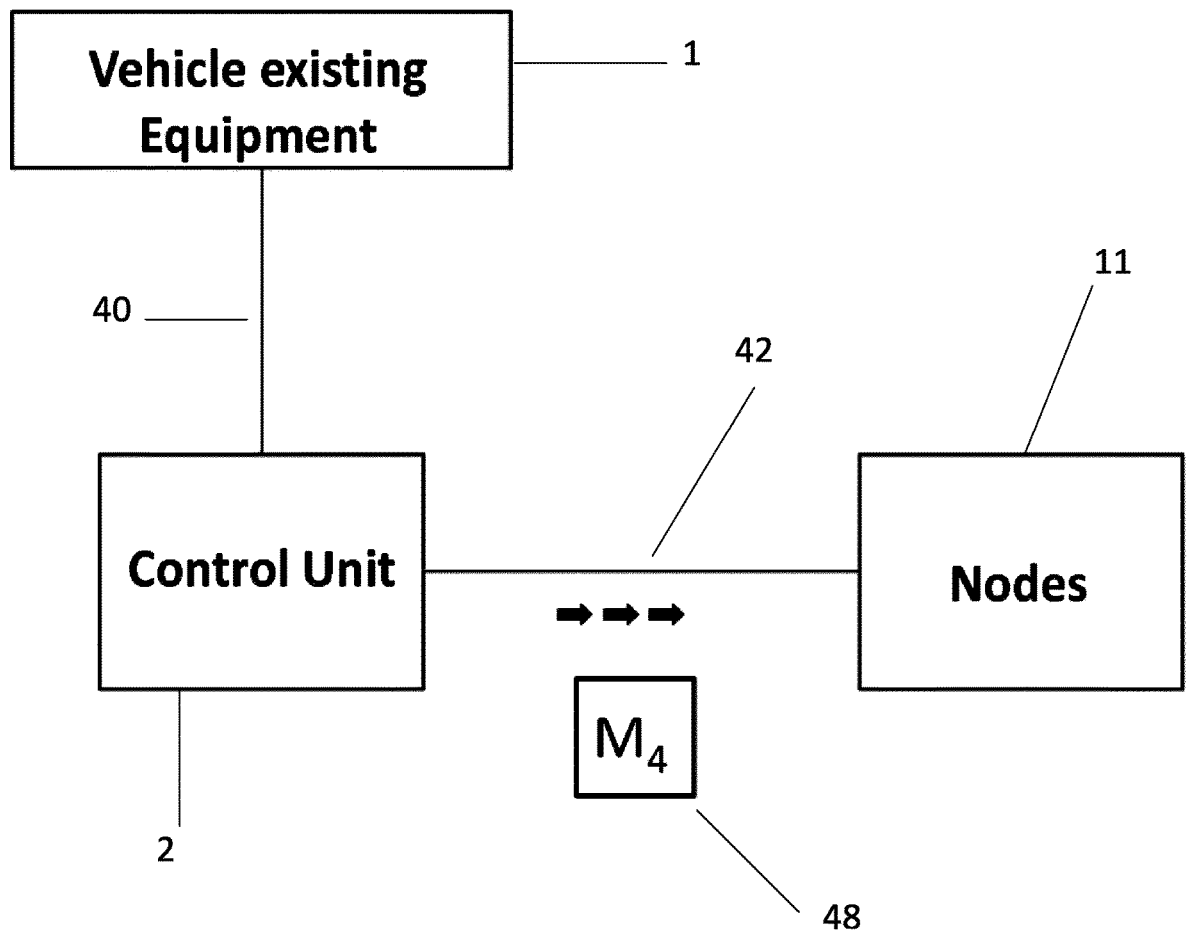

As shown in FIG. 4C, the vehicle controller apply the change, and respond to the LLCU, sending a message M3 with the encoding of the actual state of the vehicle climate setting. Once the message M3 is received at the control unit, the LLCU can display on the change on its interface. As shown, in FIG. 4D the change, the LLCU of the control unit converts the message M3 to a suitable message M4 that is sent to the node 11 to notify of the change.

For example, as shown in FIGS. 5A, 5B, 5C, and 5D, the control unit is connected to the vehicle existing equipment through the network 40. The control unit is connected to the nodes through the network 42. The control unit is connected to other devices through the network 43. As shown, in FIGS. 5A and 5B, when a message N1 is received at the control unit, the control unit can open the message N1 and identify the content of the message and the destination of the message.

As the control unit is connected to the vehicle existing equipment 1 and other devices 10, the control unit can identify whether the message N1 is destined to the vehicle existing equipment 1 or other devices 10.

For example, the content of the message N1 can be a status request and change of the HVAC controller of the vehicle. Then, the controller will convert the message N1 to a suitable message N2. The message N2 is destined for the HVAC controller, which are part of the vehicle existing equipment. By converting the message N1 to a suitable message N2, the control can assign the address of the HVAC controller inside the message N2, as the message N2 will be sent over the network 40. The network 40 can be a CAN network, which came with the vehicle.

The control unit can use a totally different format for N2 then the format used in the message N1.

For example, in building the message N2, the control unit can use a beginning bit (called the "start of frame" or "start of message" bit), followed by an "identifier" code (such an 11 bit code that tells what kind of data the message contains), followed by a priority code ("remote transmission request" that says how important the data is) followed by 0 to 8 bytes (one byte equals 8 bits) of actual data, followed by some more bits that verify the information (cyclic redundancy check), followed by some end of message bits and an "end-of-frame" bit.

Figure 5A:
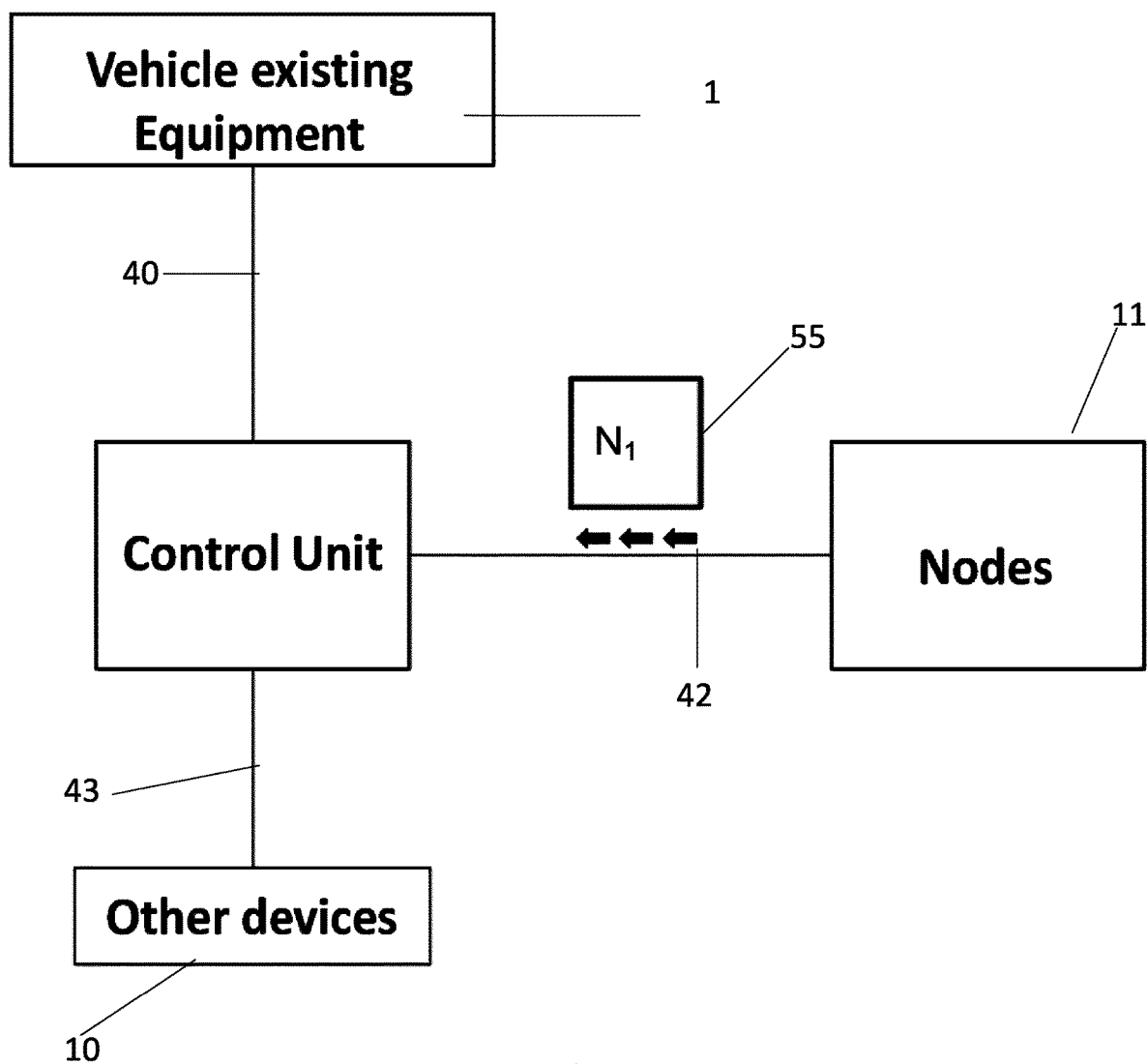
FIGS. 5A, 5B, 5C and 5D show a method for sending messages and confirming messages on the vehicle management system according to one example.
Figure 5B:
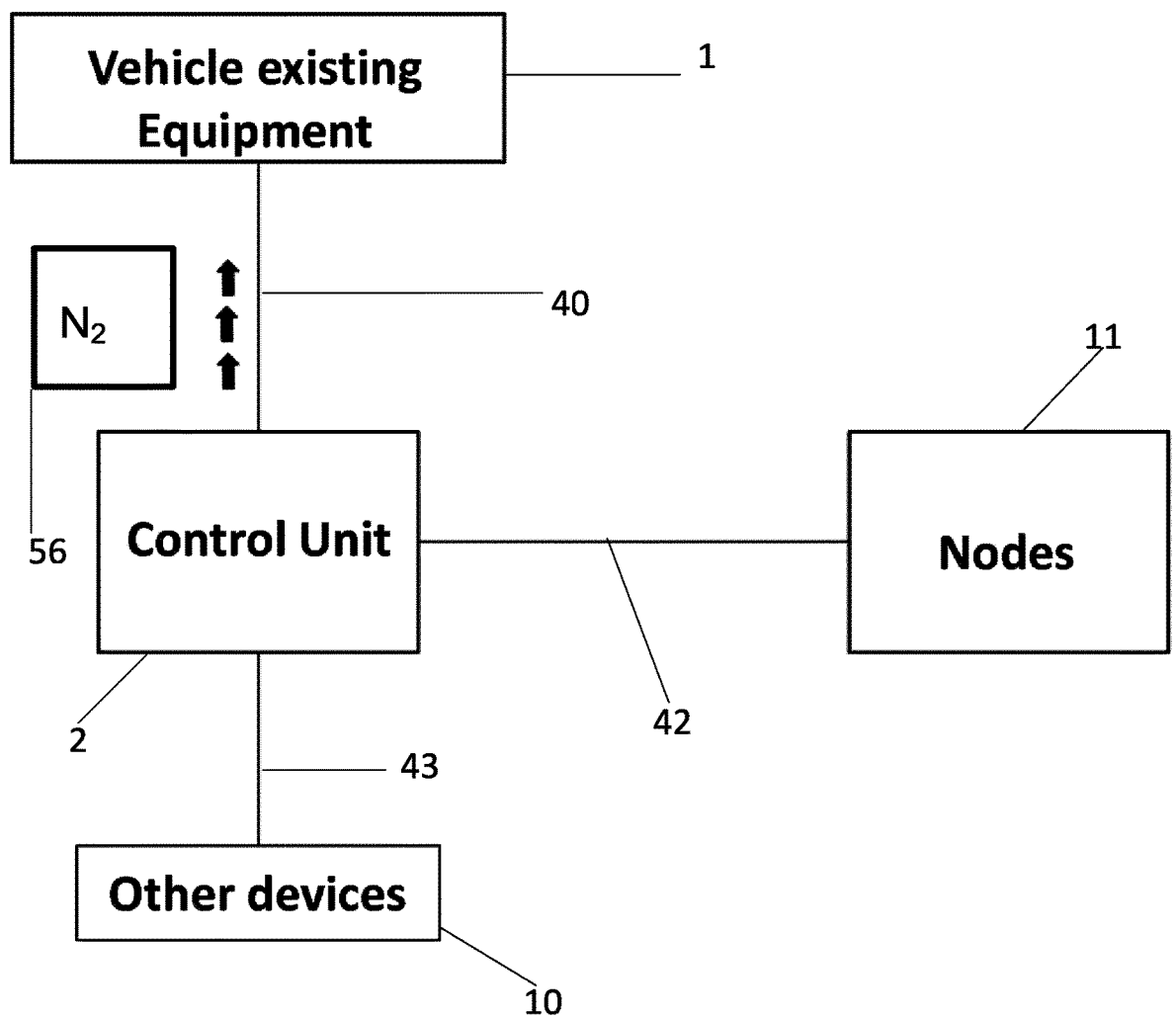
Figure 5C:
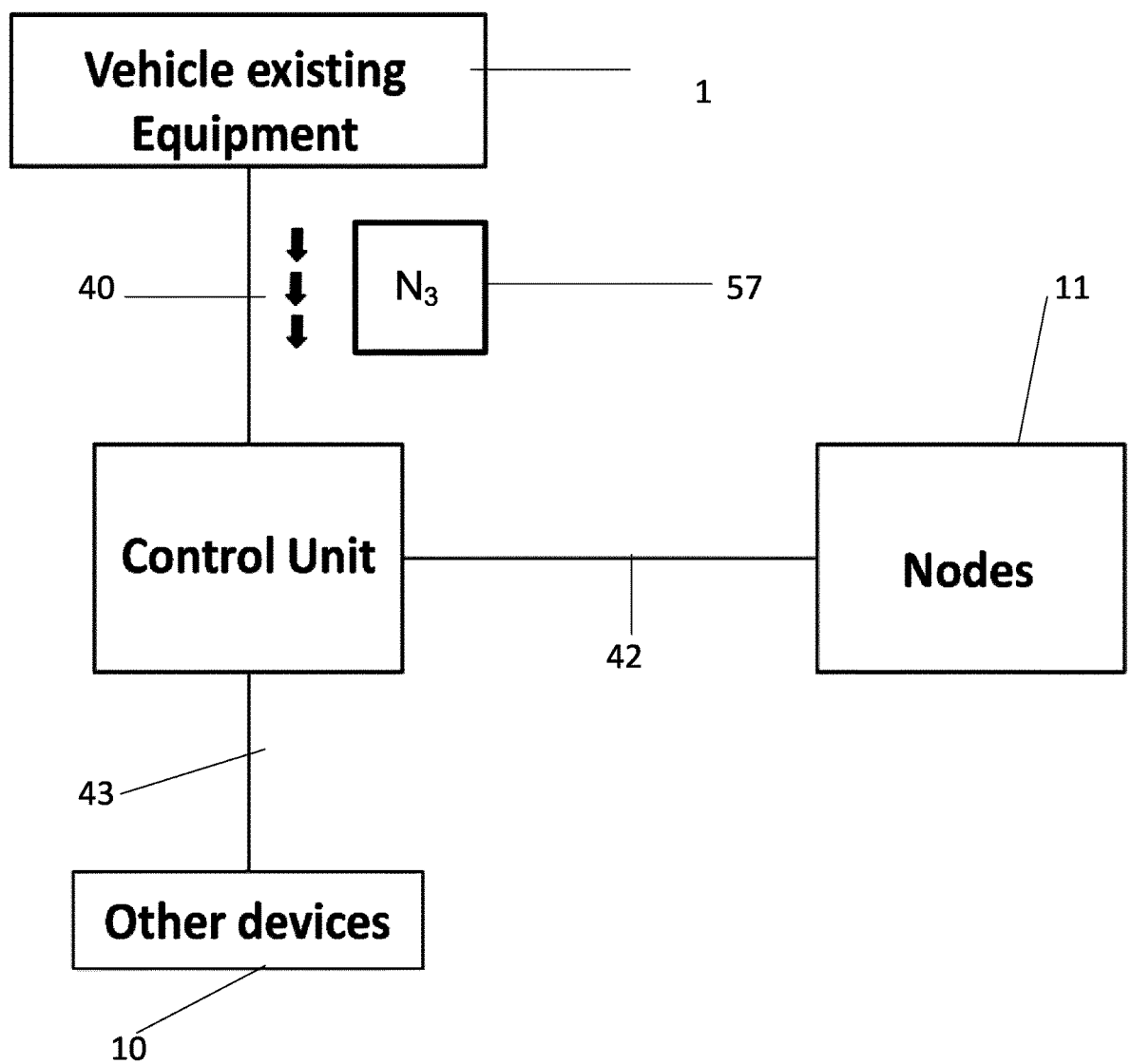
Figure 5D:
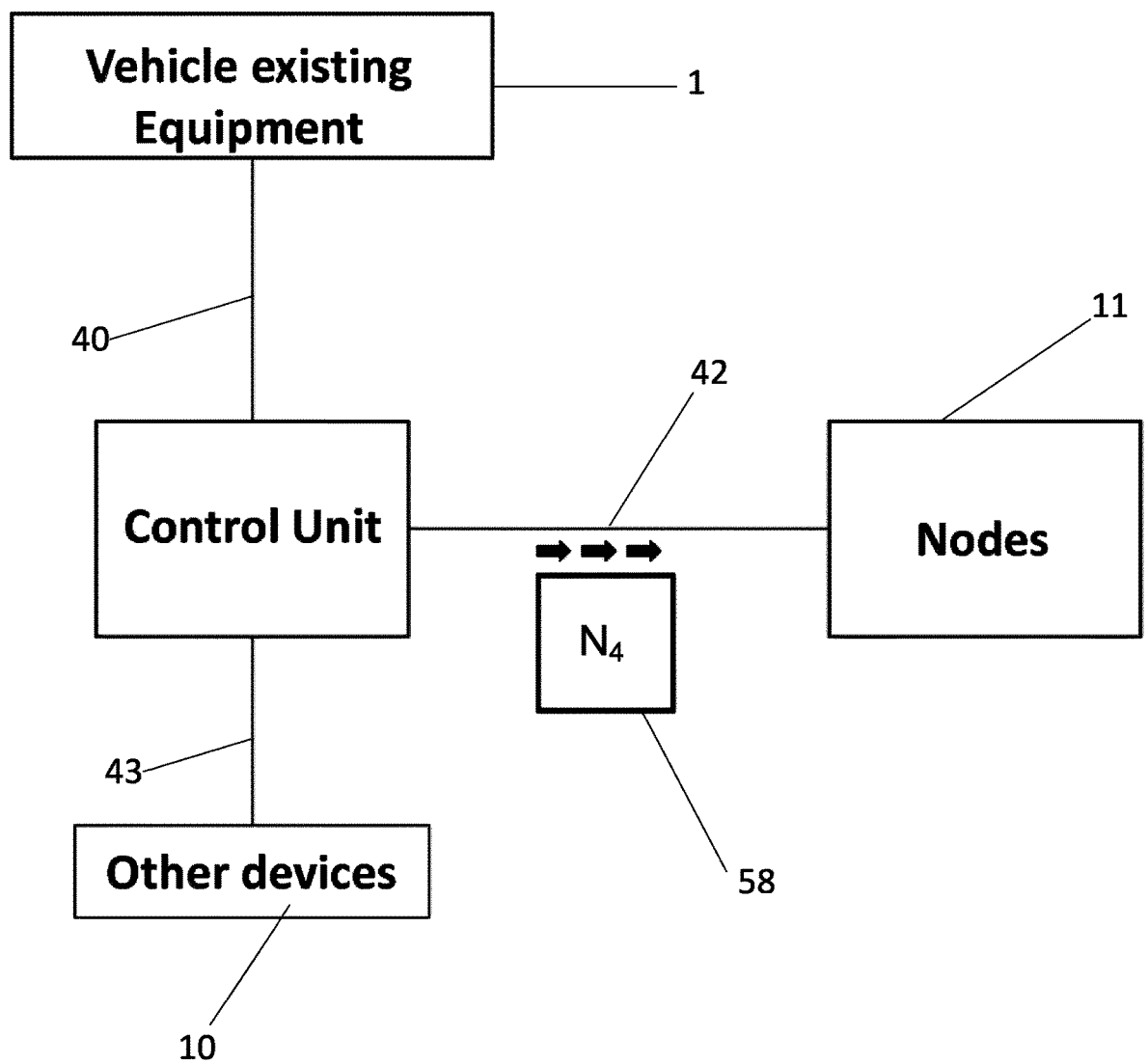

For example, in FIG. 5C, the vehicle HVAC controller applied the change, and respond to the control, sending a message N3 with the encoding of the actual state of the vehicle climate setting. For example, in FIG. 5D, the control unit converts the message N3 to a suitable message N4 that is sent to the node 11 to notify of the change.

For example, as shown in FIGS. 6A, 6B, 6C, and 6D, the control unit is connected to the vehicle existing equipment through the network 40. The control unit is connected to the nodes 11 through the network 42. The control unit is connected to other devices 10 through the network 43. A message P1 is sent from the node 11 to the control unit over the network 42. Once P1 is received at the control unit, the control unit determines that P1 is destined to the another other device 10 that is not part of the vehicle existing equipment.

Figure 6A:
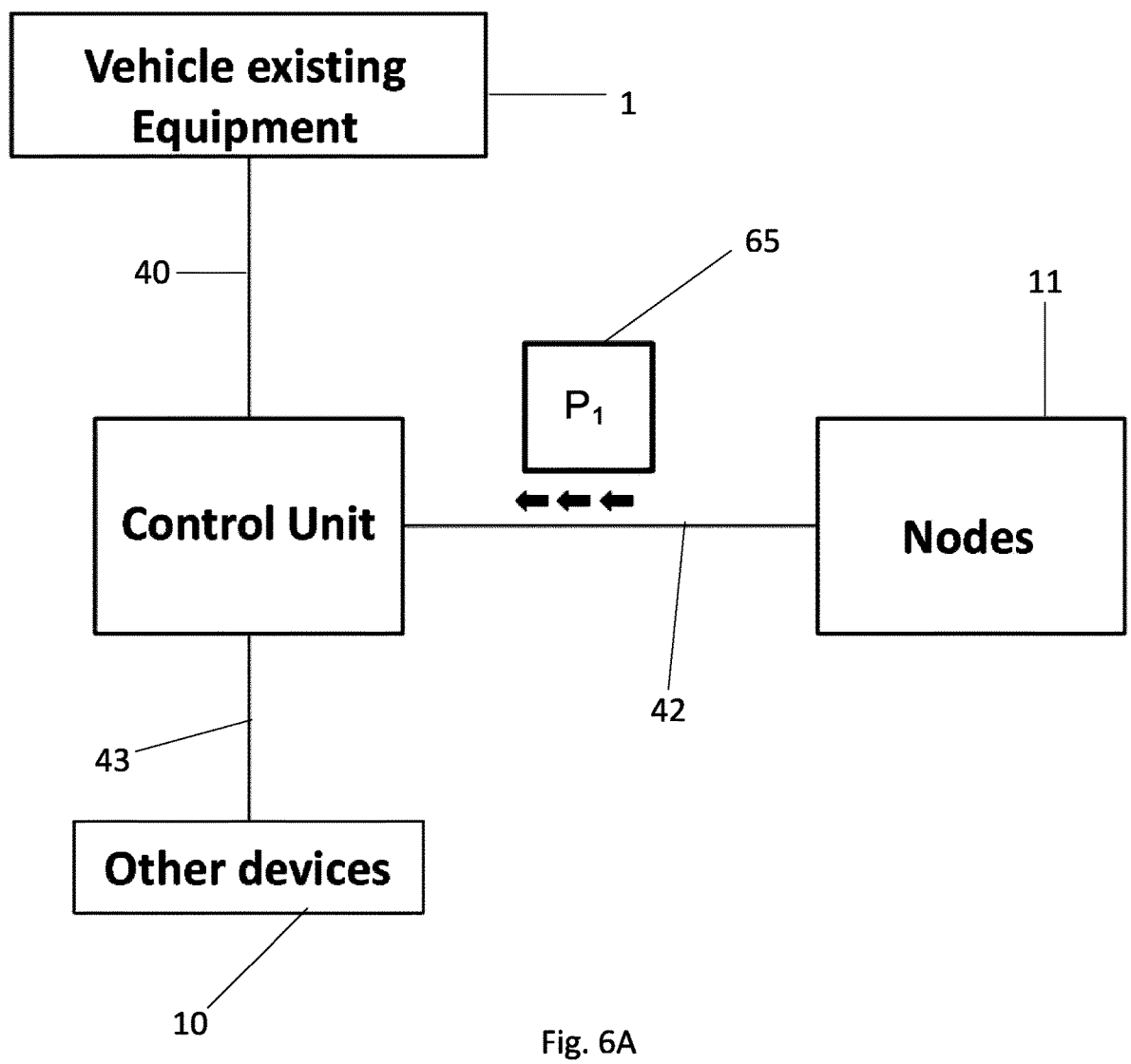
FIGS. 6A, 6B, 6C and 6D show a method for sending messages and confirming messages on the vehicle management system according to one example.
Figure 6B:
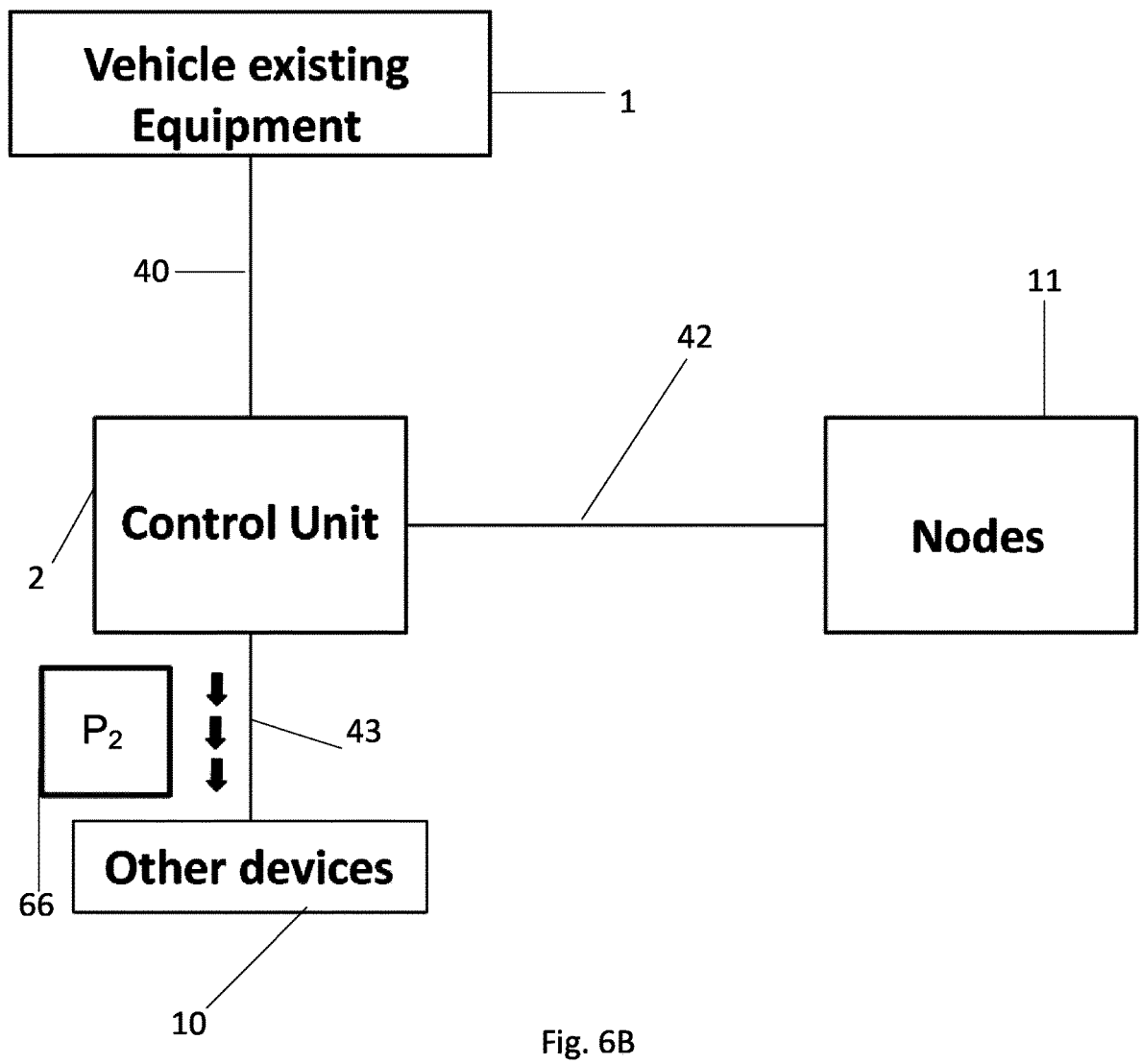
Figure 6C:
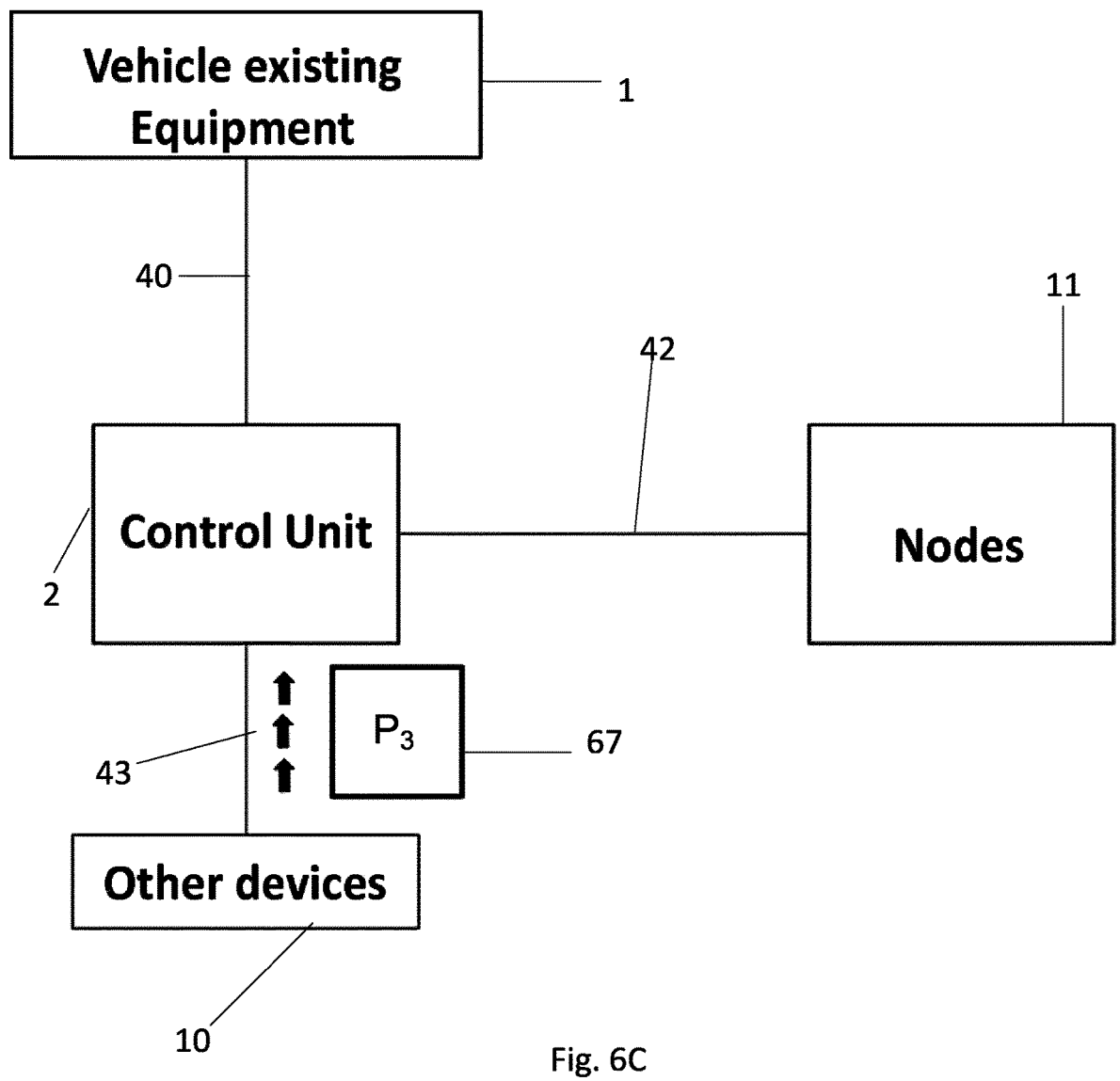
Figure 6D:
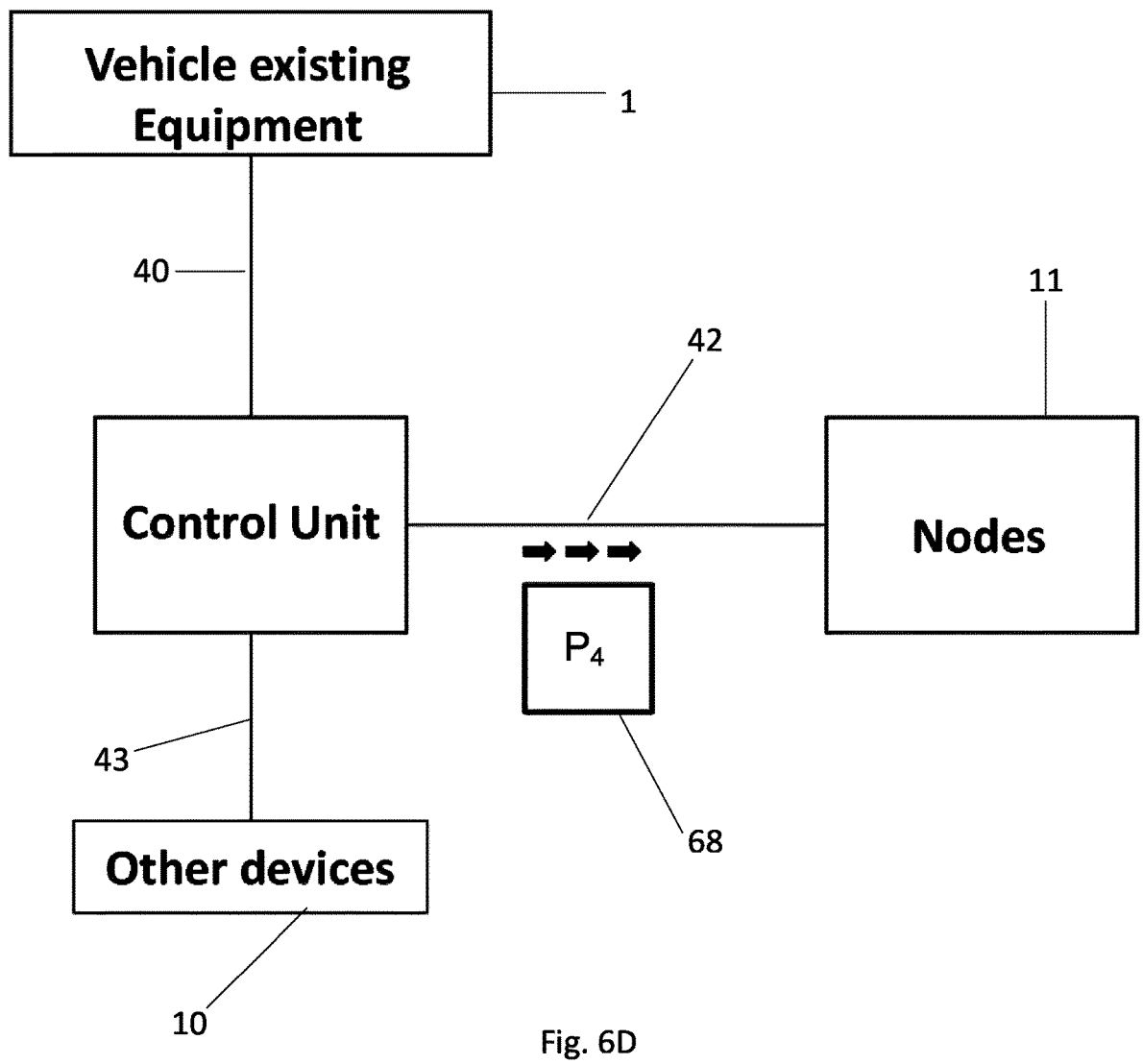

The Control Unit send converts the message P1 into a suitable message P2 that is sent to the other device 10 over the network 43. For example, the message P2 can request that the other device 10 sets its outputs or displays to a certain value. The other device 10 applied the change request, and send back a message P3, as shown in FIG. 6C, to the control unit confirming the change. Messages from this scenario will never been transmitted to the vehicle equipment over the vehicle network. The control unit then sends a message P4 to the node 11, confirming the change, as shown in FIG. 6D.

Figure 7A:
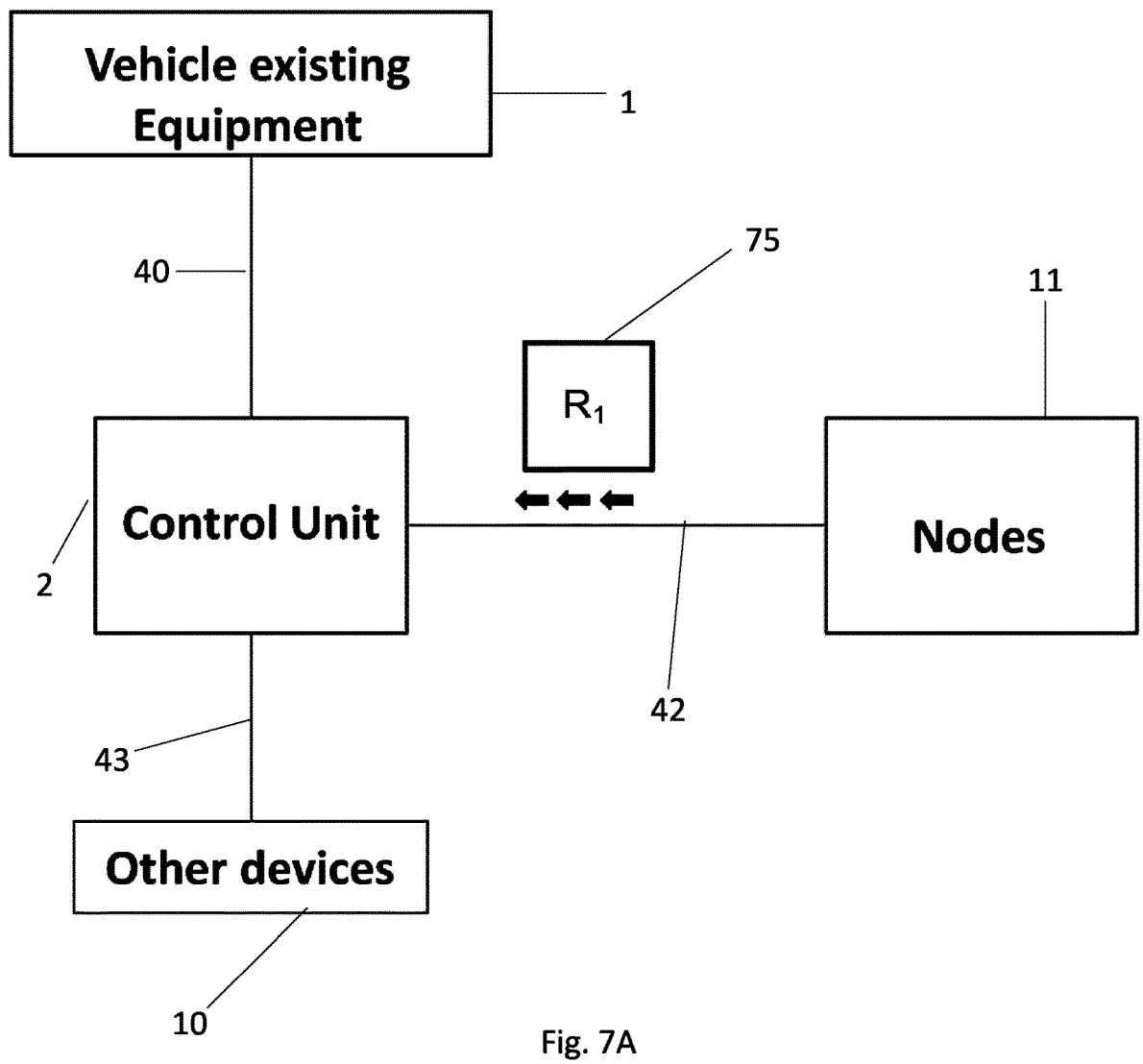
FIGS. 7A, 7B, 7C and 7D show a method for sending messages and confirming messages on the vehicle management system according to one example.
Figure 7B:
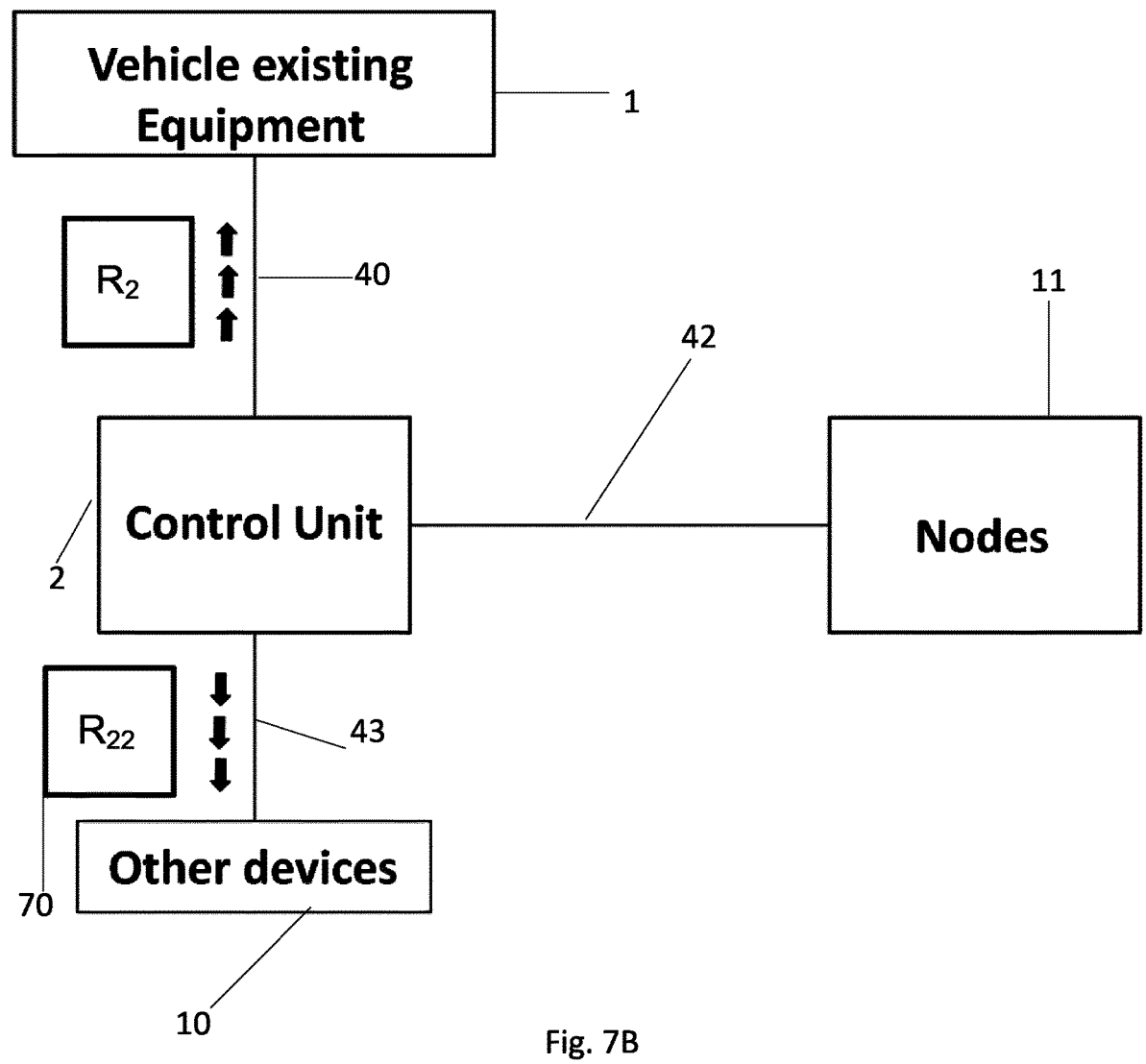
Figure 7C:
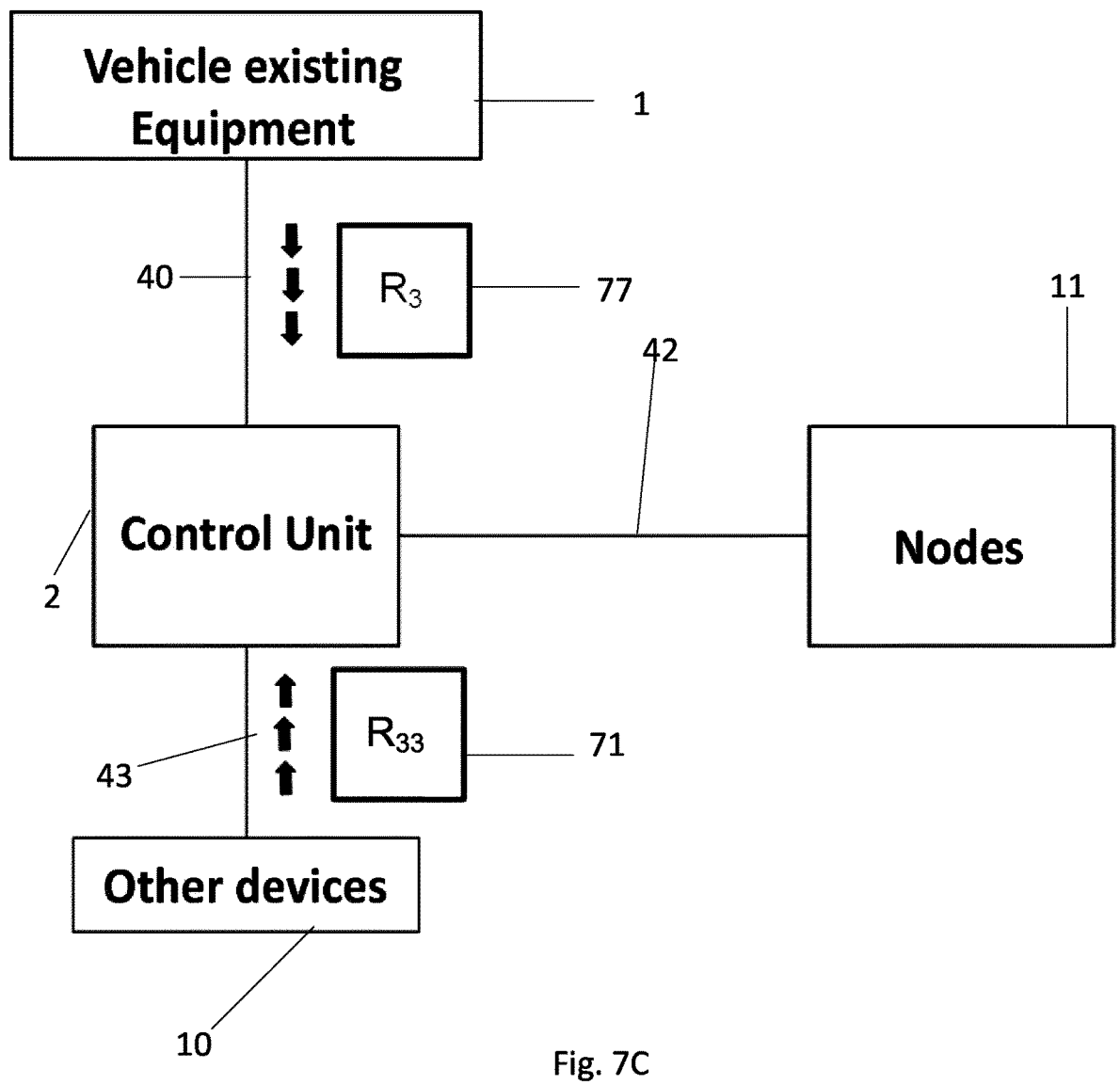
Figure 7D:
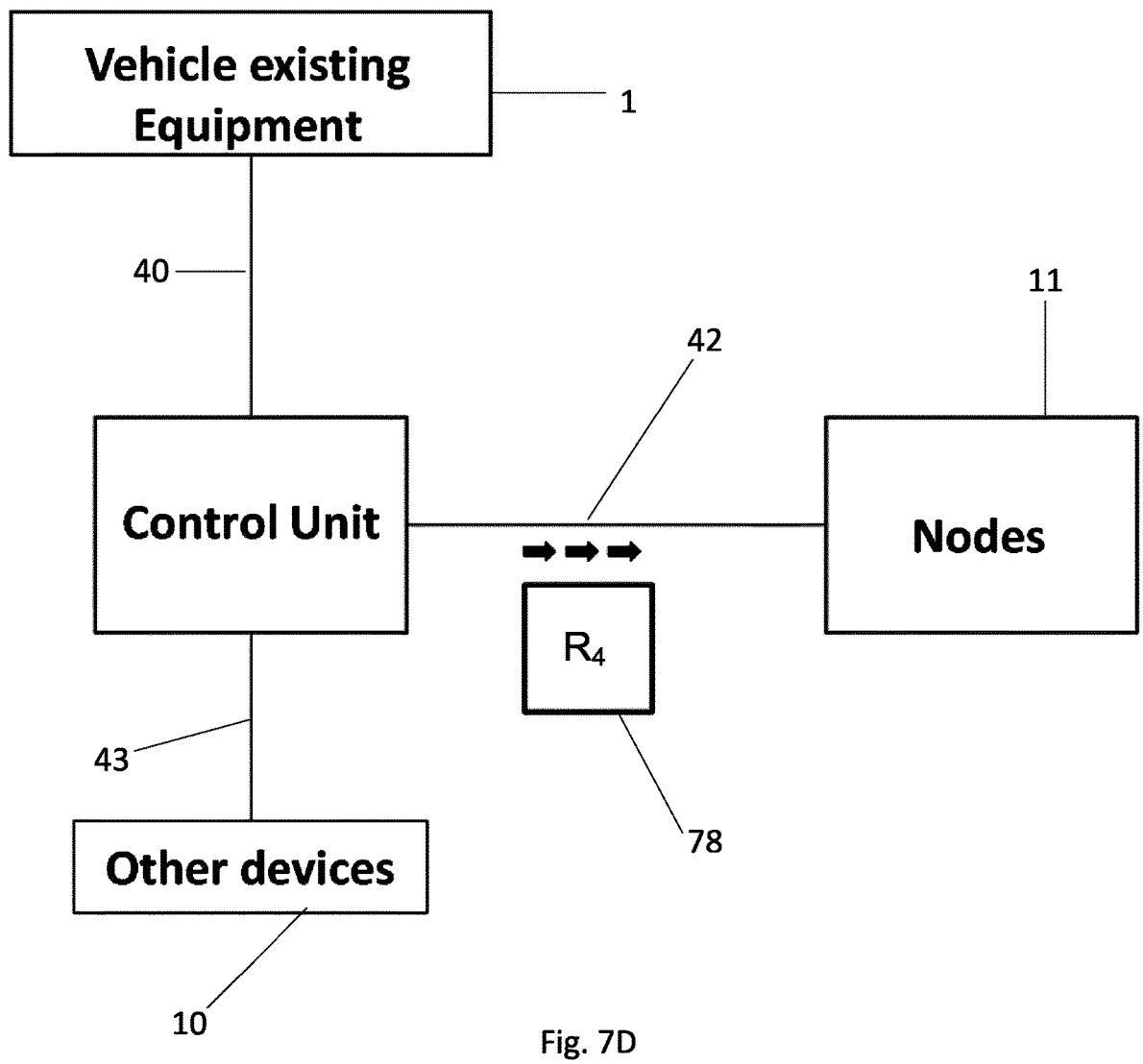

For example, as shown in FIGS. 7A, 7B, 7C, and 7D, the control unit is connected to the vehicle existing equipment through the network 40. The control unit is connected to the nodes 11 through the network 42. The control unit is connected to other devices 10 through the network 43. In FIGS. 7A and 7B, the node sends a message R1 to the control unit. The control unit determines that the message is destined to both the other devices 10 and vehicle existing equipment 1. In this case, the control unit converts the message R1 to two suitable message R2 and R22. R2 is sent to the vehicle existing equipment and R22 is sent to the other device 10. Both will send confirmation messages R3 and R33 back to the control unit, which will convert them to a suitable message R4 that is sent to the node 11.

The system offer the integration of many components of different vehicle manufacturers within the same system.

Although the system has been described with the aid of specific embodiments, it should be understood that several variations and modifications may be grafted onto said embodiments and that the present subject matter encompasses such modifications, usages or adaptations of the present subject matter that will become known or conventional within the field of activity to which the system pertains, and which may be applied to the essential elements mentioned above.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combination, when applicable, between the embodiments of any paragraphs and the processes of the SUMMARY OF THE DISCLOSURE are hereby covered by the present disclosure.

The invention claimed is:

1. A configurable management system for a vehicle, comprising:
   a receiving unit adapted to receive a message associated with a vehicle resource from a communication network of the vehicle;
   a control unit adapted to determine the vehicle resource associated with the received message; and
   an integration unit comprising an external network connected to the control unit and the integration unit further comprising at least one node, wherein the at least one node is configured to send an external message on the external network to the control unit,
   wherein the control unit converts the external message to a suitable message that is sent to the vehicle resource;
   the control unit is configured to:
      interact directly or indirectly with any other component of the configurable management system and to assure universality of a communication with vehicle electronic control unit (ECU) and independently of a type of the vehicle and assure management of mission critical functionalities; and
      interact with an auxiliary unit configured to:
         manage the communication with servers external to the vehicle, and
         provide an operator of the configurable management system with installed applications related to desired non critical functionalities, and
      the control unit controls functioning of the auxiliary unit and is capable of assuring functioning of critical functionalities of the configurable management system even when the auxiliary unit is not in operation.

2. The configurable management system of claim 1, wherein the control unit matches the vehicle resource to a control output.

3. The configurable management system of claim 1, wherein the control unit sends the suitable message to the vehicle resource through a control output.

4. The configurable management system of claim 3, wherein the control unit activates or deactivates the control output.

5. The configurable management system of claim 1, wherein the control unit sends an outcoming message to the vehicle resource based on preconfigured events.

6. The configurable management system of claim 1, wherein the control unit is further adapted to receive a control message associated with a vehicle control.

7. The configurable management system of claim 6, wherein the control unit reconfigures the control message to control a new vehicle resource.

8. The configurable management system of claim 1, wherein a communication bus comprises a controller area network (CAN) bus.

9. The configurable management system of claim 1, wherein the receiving unit comprises at least one first port for connecting the configurable management system to the communication network and wherein the at least one first port has a controllable connection speed.

10. The configurable management system of claim 1 wherein the configurable management system further comprises a screen and wherein the screen is positionable in more than one position inside the vehicle.

11. The configurable management system of claim 10 wherein the more than one position comprises a ceiling, a police console or a central area of a dashboard.

12. The configurable management system of claim 1 wherein the at least one node comprises an emergency equipment, and emergency keypad and a remote control.

13. A configurable management device comprising:
    a receiving unit adapted to receive a vehicle message associated with a vehicle resource from a communication network of a vehicle and to receive an external message from at least one node on an external network; and
    a control unit adapted to determine the vehicle resource associated with the received vehicle message;
    wherein the control unit converts the external message to a suitable message that is sent to the vehicle resource;
    the control unit is configured to:
       interact directly or indirectly with any other component of the configurable management device and to assure universality of a communication with vehicle electronic control unit (ECU) and independently of a type of the vehicle and assure management of mission critical functionalities; and
       interact with an auxiliary unit configured to:
          manage communication with servers external to the vehicle, and
          provide an operator of the configurable management device with installed applications related to desired non critical functionalities, and
       the control unit controls functioning of the auxiliary unit and is capable of assuring functioning of critical functionalities of the configurable management device even when the auxiliary unit is not in operation.

* * * * *